US007998534B2

(12) United States Patent
Swanson et al.

(10) Patent No.: US 7,998,534 B2
(45) Date of Patent: Aug. 16, 2011

(54) SYSTEM AND METHOD FOR CONTROLLING CURL IN MULTI-LAYER WEBS

(75) Inventors: Ronald P. Swanson, Woodbury, MN (US); Andrew J. Henderson, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 962 days.

(21) Appl. No.: 11/861,742

(22) Filed: Sep. 26, 2007

(65) Prior Publication Data

US 2008/0081123 A1 Apr. 3, 2008

Related U.S. Application Data

(60) Provisional application No. 60/827,380, filed on Sep. 28, 2006, provisional application No. 60/827,378, filed on Sep. 28, 2006.

(51) Int. Cl.
*B05D 3/12* (2006.01)
*C08F 2/46* (2006.01)

(52) U.S. Cl. ......... 427/496; 427/162; 427/299; 427/508

(58) Field of Classification Search .................. 427/162, 427/299, 496, 508
See application file for complete search history.

(56) References Cited

U.S. PATENT DOCUMENTS

| | | | |
|---|---|---|---|
| 16,384 | A | 1/1857 | Hamblen |
| 236,068 | A | 12/1880 | Newcomb |
| 273,040 | A | 2/1883 | Dexter |
| 478,255 | A | 7/1892 | Edwards et al. |
| 751,527 | A | 2/1904 | Marr |
| 754,797 | A | 3/1904 | Ostrander |
| 1,167,036 | A | 1/1916 | Witham, Sr. et al. |
| 1,191,297 | A | 7/1916 | Gardner |
| 1,238,742 | A | 9/1917 | Butler |
| 1,288,643 | A | 12/1918 | Mayer |

(Continued)

FOREIGN PATENT DOCUMENTS

DE 198 08 518 8/1999

(Continued)

OTHER PUBLICATIONS

U.S. Appl. No. 11/861,769, Swanson et al., "System and Method for Controlling Curl in Multi-Layer Webs," filed Sep. 26, 2007.
E. M. Corcoran, "Determining Stresses in Organic Coatings Using Plate Beam Deflection," Journal of Paint Technology, vol. 41, No. 538, pp. 635-640, Nov. 1969.
L. F. Francis, A. V. McCormick, and D. M. Vaessen, "Development and Measurement of Stress in Polymer Coatings," Journal of Materials Science, 37: 4717-4731, 2002.

(Continued)

*Primary Examiner* — Elena T Lightfoot
(74) *Attorney, Agent, or Firm* — Nicole J. Einerson; Douglas B. Little

(57) ABSTRACT

A system and method for controlling curl in multi-layer webs. The method can include providing a coated web, bending the web to induce a strain or pre-curl in the web, and curing the coating to form a multi-layer web. Some coatings at least partially shrink when cured such that curing the coating induces a curl in the multi-layer web. Bending the web occurs prior to curing the coating, and the pre-curl can be configured to at least partially counteract the curl induced by curing to form a multi-layer web having a desired curvature. The system can include a curing section configured to cure a coating, and can further include a web bending section configured to bend the web to induce a strain in the web. The web bending section can be positioned upstream of the curing section such that the web is bent prior to the coating being cured.

18 Claims, 9 Drawing Sheets

U.S. PATENT DOCUMENTS 1,432,832 A 10/1922 Brockett
1,469,875 A 10/1923 Beauregard
1,481,866 A 1/1924 Heist
RE16,384 E 7/1926 McCrohan et al.
1,654,946 A 1/1928 Sinks
1,691,023 A 11/1928 Dye
1,792,596 A 2/1931 Livingston
1,880,451 A 10/1932 Hopkins
1,891,782 A 12/1932 Sager
2,027,564 A 1/1936 Stein et al.
2,028,700 A 1/1936 Guier
2,037,825 A 4/1936 Salfisberg
2,066,872 A 1/1937 Adams et al.
2,070,505 A 2/1937 Beck
2,152,101 A 3/1938 Scherer
2,137,887 A 11/1938 Abbott
2,141,318 A 12/1938 Salfisberg
2,184,744 A 12/1939 Jonassen
2,259,362 A 10/1941 Young
2,293,178 A 8/1942 Stocker
2,307,817 A 1/1943 Austin
2,334,022 A 11/1943 Minich
2,335,190 A 11/1943 Minich
2,339,070 A 1/1944 Hayes
2,348,162 A 5/1944 Warner
2,370,811 A 3/1945 Osgood, Jr.
2,373,040 A 4/1945 Macdonald et al.
2,398,822 A 4/1946 Faris et al.
2,403,482 A 7/1946 Cloud
2,411,774 A 11/1946 Gundelfinger
2,412,187 A 12/1946 Wiley et al.
2,434,111 A 1/1948 Hawley, Jr. et al.
2,454,999 A 11/1948 Eaton
2,468,697 A 4/1949 Wiley
2,483,339 A 9/1949 Gardner et al.
2,490,781 A 12/1949 Cloud
2,505,146 A 4/1950 Ryan
2,531,619 A 11/1950 Gonia
2,540,986 A 2/1951 Klein et al.
2,545,868 A 3/1951 Bailey
2,547,836 A 4/1951 Pfeiffer
2,559,365 A 7/1951 Middleton et al.
2,559,705 A 7/1951 Borkland
2,578,899 A 12/1951 Pace. Jr.
2,582,165 A 1/1952 Rosenfeld
2,597,877 A 5/1952 LeClair
2,600,295 A 6/1952 Hommel
2,618,012 A 11/1952 Milne
2,658,432 A 11/1953 Baumgartner
2,660,218 A 11/1953 Johnson et al.
2,698,982 A 1/1955 Smith et al.
2,702,406 A 2/1955 Reed
2,737,089 A 3/1956 Baumgartner
2,745,134 A 5/1956 Collins
2,893,053 A 7/1959 Powell
2,918,891 A 12/1959 Klabunde
2,918,897 A 12/1959 Zernov
2,976,924 A 3/1961 Baxter, Jr.
3,044,228 A 7/1962 Peterson
3,076,492 A 2/1963 Monks
3,215,558 A 11/1965 Dascher
3,344,493 A 10/1967 Telgheider
3,366,298 A 1/1968 Bahrani
3,373,288 A 3/1968 Otepka et al.
3,418,406 A 12/1968 Ball
3,498,878 A 3/1970 Obenshaln
3,510,036 A 5/1970 Lewis, Jr.. et al.
3,552,668 A 1/1971 Kanno
3,567,093 A 3/1971 Johnson
3,604,652 A 9/1971 Sleeper
3,724,732 A 4/1973 Bonner
3,774,831 A 11/1973 Paradine
3,775,129 A * 11/1973 Dodwell ...................... 430/537
3,799,038 A 3/1974 Bossons et al.
3,831,828 A 8/1974 Royon et al.
3,833,973 A 9/1974 Schwarz
3,854,441 A 12/1974 Park
3,890,547 A 6/1975 Keck
3,913,729 A 10/1975 Andrews
3,939,025 A 2/1976 Kane
3,974,952 A 8/1976 Swanke et al.
3,976,528 A 8/1976 James
4,002,047 A 1/1977 MacPhee et al.
4,013,284 A 3/1977 Demetre
4,015,050 A 3/1977 Birchall et al.
4,033,492 A 7/1977 Imai
4,043,995 A * 8/1977 Kitzing et al. ................ 530/354
4,060,236 A 11/1977 Carstedt
4,069,081 A 1/1978 Drower et al.
4,069,959 A 1/1978 Bartell et al.
4,119,309 A 10/1978 Mayer et al.
4,141,735 A 2/1979 Schrader et al.
4,182,472 A 1/1980 Peekna
4,187,113 A 2/1980 Mathews et al.
4,190,245 A 2/1980 Brandes
4,300,891 A 11/1981 Bemiss
4,300,969 A 11/1981 Frydendal
4,322,802 A 3/1982 Lewis et al.
4,342,412 A 8/1982 Lorenz et al.
4,343,991 A 8/1982 Fujiwara et al.
4,360,356 A 11/1982 Hall
4,389,455 A 6/1983 Asao
4,467,949 A 8/1984 Nakata
4,471,816 A 9/1984 Wada
4,539,072 A 9/1985 Frye et al.
4,579,815 A * 4/1986 Kiritani et al. ................ 430/538
4,598,849 A 7/1986 Frye et al.
4,657,614 A 4/1987 Andersson
4,862,565 A 9/1989 Damour
4,917,844 A 4/1990 Komai et al.
4,925,520 A 5/1990 Beaudoin et al.
4,952,281 A 8/1990 Akira
5,043,036 A 8/1991 Swenson
5,124,743 A 6/1992 Shiota
5,141,484 A 8/1992 Akira
5,244,861 A 9/1993 Campbell et al.
5,290,672 A 3/1994 Dunk
5,387,501 A 2/1995 Yajima et al.
5,466,519 A 11/1995 Shirakura et al.
5,517,737 A 5/1996 Viltro et al.
5,536,561 A 7/1996 Turi et al.
5,560,793 A 10/1996 Ruscher et al.
5,677,050 A 10/1997 Bilkadi et al.
5,738,907 A 4/1998 Vaccaro et al.
5,853,965 A 12/1998 Haydock et al.
5,866,282 A 2/1999 Bourdelais et al.
5,874,205 A 2/1999 Bourdelais et al.
5,888,643 A 3/1999 Aylward et al.
5,928,124 A 7/1999 Gherardi et al.
5,975,745 A 11/1999 Oishi et al.
6,030,742 A 2/2000 Bourdelais et al.
6,152,345 A 11/2000 Griffin et al.
6,238,448 B1 * 5/2001 Rouse et al. .................... 51/297
6,272,984 B1 8/2001 Kato et al.
6,273,984 B1 8/2001 Bourdelais et al.
6,362,020 B1 3/2002 Shimoda et al.
6,489,015 B1 12/2002 Tsuchiya et al.
6,626,343 B2 9/2003 Crowley et al.
6,637,128 B2 10/2003 Kuroiwa et al.
6,680,084 B1 1/2004 Chtourou
6,686,031 B2 2/2004 Matsufuji et al.
6,820,671 B2 11/2004 Calvert
6,841,254 B2 1/2005 Okajima et al.
2001/0051275 A1 12/2001 Muraoka
2003/0082977 A1 5/2003 Kuroiwa et al.
2004/0235380 A1 11/2004 Kapik
2005/0133965 A1 6/2005 Yu et al.
2005/0212173 A1 9/2005 Swanson
2005/0246965 A1 11/2005 Swanson
2006/0182901 A1 8/2006 Takagi
2008/0081164 A1 4/2008 Swanson et al.

FOREIGN PATENT DOCUMENTS

EP 0 140 496 5/1985
EP 0 472 393 2/1992
EP 0 658 505 A1 6/1995
EP 0 672 516 9/1995

| | | | |
|---|---|---|---|
| EP | 0 688 665 | | 12/1995 |
| EP | 1 066 979 | A2 | 1/2001 |
| EP | 1 258 555 | A1 | 11/2002 |
| EP | 1 317 966 | | 6/2003 |
| GB | 456832 | | 8/1935 |
| JP | 63-171755 | | 7/1988 |
| WO | 97/32069 | | 9/1997 |
| WO | 98/56702 | | 12/1998 |
| WO | WO 2007/110484 | | 10/2007 |
| WO | 2008/039820 | | 4/2008 |

OTHER PUBLICATIONS

R. P. Swanson, "Measurement of Web Curl," Proceedings of the Applied Webhandling Conference, AIMCAL, May 7-10, 2006, 9 pages.

S.G. Croll, "Internal Stress in a Solvent-Cast Thermoplastic Coating," Journal of Coatings Technology, vol. 50, No. 638, pp. 33-38, Mar. 1978.

* cited by examiner

SYSTEM AND METHOD FOR CONTROLLING CURL IN MULTI-LAYER WEBS

RELATED APPLICATIONS

Priority is hereby claimed to U.S. Provisional Patent Application No. 60/827,380 (3M File No. 60656US002), filed Sep. 28, 2006 and U.S. Provisional Patent Application No. 60/827,378 (3M File No. 62541US002), filed Sep. 28, 2006, both of which are incorporated herein by reference in their entirety.

FIELD

The present disclosure generally relates to multi-layer webs and controlling curl in multi-layer webs, particularly, multi-layer webs in which at least one layer comprises a cured coating.

BACKGROUND

Some multi-layer webs have a tendency to curl. Curl can be defined as the tendency of a web (or multi-layer web) to deviate from a generally flat or planar orientation when there are no external forces on the web. Curled webs can be viewed as a defective product and can be more difficult to handle in downstream web handling or manufacturing processes than flat webs. For example, processes such as laminating, inspecting, and converting can be more challenging with a curled web than with a flat web. In addition, some multi-layer webs that are formed of a coating applied to an underlying web are used in applications in which the non-coated side of the multi-layer web is coupled to another object such that the coated side of the multi-layer web faces outwardly. Such multi-layer webs tend to curl toward the coated side, which can cause problems with delamination. In such applications, flat multi-layer webs, or webs that tend to curl to the non-coated side may be easier to apply, and may result in better adhesion, less delamination, and longer product lives. In other applications, a particular amount and orientation of curvature is necessary.

As a result, web handling processes and systems that produce a multi-layer web having a desired curvature may reduce the problems described above and improve product quality and reduce manufacturing waste.

SUMMARY

An aspect of the present disclosure is directed to a method for reducing strain-induced curl in a multi-layer web. The method can include providing a web of indeterminate length, and applying a coating to the web, the coating being characterized by at least partially shrinking when cured. The method can further include curing the coating to form a multi-layer web, the multi-layer web including a curl induced by curing the coating. The method can further include bending the web prior to curing the coating to induce a pre-curl in the web. The pre-curl can be configured to substantially match and oppose the curl induced by curing.

An aspect of the present disclosure is directed to a method for reducing strain-induced curl in a multi-layer web. The method can include providing a web of indeterminate length, bending the web to induce a strain in the web, applying a coating to the web, and curing the coating to form a multi-layer web, the coating being characterized by at least partially shrinking when cured such that curing the coating induces a curl in the multi-layer web. Bending the web can occur prior to curing the coating, and the strain induced by bending can substantially cancel the curl induced by curing.

An aspect of the present disclosure is directed to a method for producing a multi-layer web having a desired curvature. The method can include providing a web of indeterminate length, bending the web to induce a pre-curl in the web, applying a coating to the web, and curing the coating to form a multi-layer web, the coating being characterized by at least partially shrinking when cured such that curing the coating induces a curl in the multi-layer web. Bending the web can occur prior to curing the coating, and the pre-curl can be configured to at least partially counteract the curl induced by curing to form a multi-layer web having a desired curvature.

An aspect of the present disclosure is directed to a web handling system for producing a multi-layer web having a desired curvature. The web handling system can include a curing section configured to cure a coating applied to a web of indeterminate length to form a multi-layer web. The web handling system can further include a web bending section configured to bend the web to induce a strain in the web. The web bending section can be positioned upstream of the curing section such that the web is bent prior to the coating being cured.

Other features and aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "coupled" and "applied to," and variations thereof are used broadly and encompass both direct and indirect couplings and applications. It is to be understood that other embodiments may be utilized, and structural or logical changes may be made without departing from the scope of the present disclosure. Furthermore, terms such as "front," "rear," "top," "bottom," "upper," "lower," "outer," "inner," "side," and the like are only used to describe elements as they relate to one another, but are in no way meant to recite specific orientations of the apparatus, to indicate or imply necessary or required orientations of the apparatus, or to specify how the embodiments described herein will be used, mounted, displayed, or positioned in use.

Figures 1, 2, 2A:
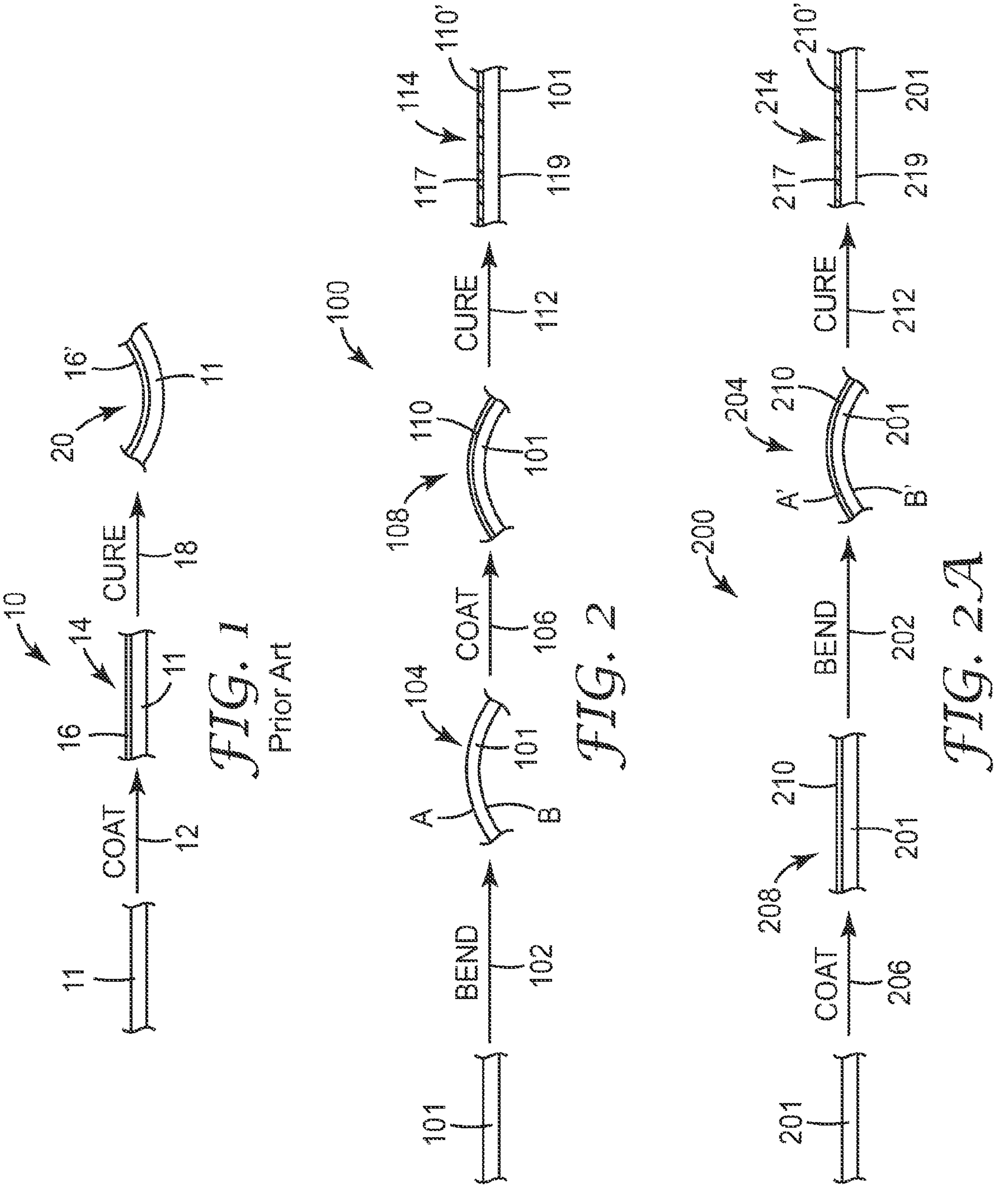
FIG. 1 Prior Art
FIG. 1 is a schematic flow chart of a prior art web handling process.
FIG. 2 is a schematic flow chart of a web handling process according to one embodiment of the present disclosure.
FIG. 2A is a schematic flow chart of a web handling process according to another embodiment of the present disclosure.

The present disclosure generally relates to multi-layer webs and controlling curl in multi-layer webs. In some multi-layer webs, at least one of the layers comprises a cured coating. For example, some multi-layer webs are formed by applying a coating to an underlying web and then curing and/or drying the coating. Many coatings have a tendency to shrink upon drying and curing, while the underlying web remains substantially the same size, which can cause the resulting multi-layer web to curl toward the coated side. This phenomenon is illustrated in FIG. 1, which schematically illustrates a prior art web coating process 10. Generally, the greater the ratio of coating thickness to underlying web thickness, the greater the curvature of the resulting multi-layer web after the coating has been cured. Furthermore, the curvature of the resulting multi-layer web generally increases with increasing coating thickness.

As shown in FIG. 1, a web 11 of indeterminate length is coated in a coating process 12 to form a coated web 14 having a coating 16 applied to the web 11. The coating 16 is then cured in a curing process 18 to form a multi-layer web 20 formed of the coating 16' in a cured state and the web 11. As shown in FIG. 1, the multi-layer web 20 includes an undesirable curvature. The curvature of the multi-layer web 20 is a result of the shrinkage of the coating 16 upon being cured, while the underlying web 11 remains substantially the same size. When the multi-layer web 20 is used in applications in which the multi-layer web 20 is required to be flat, the cured coating 16' of the multi-layer web 20 will be in tension. Over time, the stress on the coating 16' that occurs during use of the multi-layer web 20 may cause the coating 16' to crack or craze, leading to undesirable product life.

Some approaches that have been used to try to control curl in multi-layer webs include (1) reformulating the coating chemistry to reduce shrinkage, (2) under-curing the coating to reduce shrinkage (3) increasing machine direction line tensions, (4) post-cure processes such as shrinking the web, and (5) increasing the thickness of the underlying web to increase the web's resistance to curling. Option 1 generally results in an undesirable compromise between coating functionality and shrinkage, e.g., a hardcoating that is not very hard. Option 2 generally results in a coating of lower strength that is less durable, less hard, and/or less tough. In addition, because at least a portion of the coating is under-cured, it can include unreacted monomers, which can cause undesirable downstream reactions that may affect product quality. Option 3 is not always successful because increasing machine directional tension creates an increased cross-machine directional compression due to the Poisson effect, which can exacerbate cross-machine directional curl. Option 4 can be limited by the type of web used and the amount of shrinkage that is available with a given web. Option 5 can limit the types of webs that can be used and can be a limiting factor in new product design. In addition, thicker webs increase cost and are not always the most desirable for a given application or product.

On the contrary, methods of the present disclosure can be used to control the curl of the resulting multi-layer web such that the resulting multi-layer web has a desired curvature, or is substantially flat. In some embodiments of the present disclosure, the multi-layer web has a curvature of less than about 10.0 $m^{-1}$, particularly, less than about 5.0 $m^{-1}$, and more particularly, less than about 2.0 $m^{-1}$. Furthermore, in some embodiments, the multi-layer web has a curvature less than about 1.0 $m^{-1}$, particularly, less than about 0.5 $m^{-1}$, and more particularly, less than about 0.1 $m^{-1}$. In other words, in some embodiments, the multi-layer web has a radius of curvature greater than about 0.1 m, particularly, greater than about 0.2 m, and more particularly, greater than about 0.5 m. Furthermore, in some embodiments, the multi-layer web has a radius of curvature of greater than about 1 m, particularly, greater than about 2 m, and more particularly, greater than about 10 m.

By producing a multi-layer web that is substantially flat, the strains between adjacent layers are better matched such that minimal stresses are exerted on the layers when used in an application requiring a substantially flat web. As a result, multi-layer webs of the present disclosure are generally less susceptible to cracking and have longer products lives. In addition, by controlling the curl of the multi-layer web without necessarily increasing the thickness of the underlying web, a multi-layer web of a desired thickness can be formed. For example, in some embodiments of the present disclosure, the multi-layer web has a thickness of less than about 500 μm, particularly, less than about 300 μm, and more particularly, less than about 200 μm. In some embodiments, the multi-layer web has a thickness of less than about 125 μm, particularly, less than about 25 μm, and more particularly, less than about 14 μm.

Co-owned U.S. Patent Application Publication Nos. 2005/0212173 and 2005/0246965, which are incorporated herein by reference, describe removing curl in coated webs by flexing or reverse flexing the coated web after the coating has been cured. However, some coatings become brittle after being cured. Exposing such a coating to bending processes after curing can cause the coating to crack and craze, rather than yield, which can lead to poor product quality and lifespan. As a result, flexing the multi-layer web after the coating has been cured is not necessarily preferred for some coatings and multi-layer webs.

The present disclosure can be applied to a variety of webs and coatings. Examples of webs that can be used include, but are not limited to, webs formed of polymers, composite materials, wood pulp (e.g., paper), and combinations thereof. Polymeric webs can be formed of homopolymers or copolymers and can include, but are not limited to, polyethylene terephthalate (PET), polycarbonate (PC), polyolefins (e.g., polypropylene (PP), polyethylene (PE), etc.), and combinations thereof. Coatings can be formed of a variety of materials, including polymers, composite materials, and combinations thereof. Examples of polymer coatings include, but are not limited to, acrylate or epoxy coatings (e.g., acrylate or epoxy hardcoats). Examples of composite coatings include, but are not limited to, coatings that include particles or fibers (e.g., colloidal or fibrous metal or metal oxide particles).

Furthermore, a variety of curing processes suitable for curing a coating can be used, depending on the type of coating used. Examples of curing processes can include, but are not limited to, at least one of actinic radiation, UV radiation, visible-light radiation, electron beam radiation, X-ray radiation, IR radiation, heat, and combinations thereof.

The multi-layer webs of the present disclosure can be used in a variety of applications. For example, the multi-layer webs can include light-redirecting films (e.g., brightness enhancement films (e.g., prismatic-structured films), turning films, and diffusing films), multi-layer optical films, polarization films, barrier films, protective films, and combinations thereof, all of which can be used in electronic displays (e.g., liquid crystal displays (LCDs), monitors, touch screens, personal digital assistants (PDAs), cellular telephones, etc.). Particularly, in some embodiments, the multi-layer web includes a light-redirecting film having a thickness of less than about 300 μm and a curvature of less than about 0.1 $m^{-1}$. Additional examples of applications in which multi-layer webs of the present disclosure can be used include traffic control film applications, graphic film applications, other protective or barrier film application (e.g., applications in the architectural and/or transportation industries), and combinations thereof.

FIGS. 2 and 2A illustrate two alternative web handling processes 100 and 200 of the present disclosure. As shown in FIG. 2, according to the first web handling process 100, a web 101 of indeterminate length is bent in a web bending process 102 to induce a bending strain in the web 101. The strain can cause a pre-curl in the web 101, which is illustrated in FIG. 2 as a pre-curled web 104. The pre-curled web 104 is coated in a coating process 106 to form a coated web 108 having a coating 110 applied to the web 101. The coating 110 is then cured in a curing process 112 to form a multi-layer web 114. The multi-layer web 114 includes the coating in a cured state 110' coupled to the web 101.

FIG. 2A illustrates an alternative web handling process 200 of the present disclosure. As shown in FIG. 2A, according to the second web handling process 200, a web 201 of indeterminate length is coated in a coating process 206 to form a coated web 208 having a coating 210 applied to the web 201. The web 201 is then bent in a web bending process 202 to induce a strain in the web 201. Because the coating 210 has not been dried or cured at this point in the web handling process, the coating 210 has relatively fluid characteristics and is not significantly mechanically affected during the web bending process 202. The strain induced in the web 201 by the web bending process 202 can cause a pre-curl in the web 201, which is illustrated in FIG. 2A as a pre-curled web 204. Following the web bending process 202, the coating 210 is cured in a curing process 212 to form a multi-layer web 214, which includes the coating in a cured state 210' coupled to the web 201.

The first and second web handling processes 100, 200 shown in FIGS. 2 and 2A include substantially the same steps but in a different order. By examining FIGS. 2 and 2A, it can be seen that the pre-curled web 104 does not include a coating, but that the pre-curled web 204 includes a coating 210. Similarly, the coated web 108 has been pre-curled, whereas the coated web 208 is substantially without curl or internal stresses. However, both the first web handling process 100 and the second web handling process 200 include bending the web 101, 201 to induce a strain in the web 101, 201 that will at least partially counteract the strain that will be induced by curing the coating 110, 210 to obtain a multi-layer web 114, 214 that is substantially flat.

The multi-layer webs 114, 214 are illustrated in FIGS. 2 and 2A as being substantially flat by way of example only. Particularly, the webs 101, 201 illustrated in FIGS. 2 and 2A are bent to induce a strain that matches and opposes (and thus substantially cancels) the strain induced in the multi-layer webs 114, 214 by curing the respective coatings 110, 210. The resulting multi-layer webs 114, 214 lie substantially flat when there are no external forces on the multi-layer webs 114, 214. A “substantially flat” multi-layer web 114, 214 generally refers to a multi-layer web 114, 214 that has a radius of curvature of at least about 10 m, and a curvature of less than about 0.1 $m^{-1}$. With reference to FIGS. 2 and 2A, a “substantially flat” multi-layer web 114, 214 can also be described as a multi-layer web 114, 214 that has a substantially planar upper surface 117, 217 and a substantially planar lower surface 119, 219 that is substantially parallel with the upper surface 117, 217.

However, it should be understood that the strain induced in the web 101, 201 by the web bending process 102, 202 can be controlled to at least partially counteract the strain induced by curing the coating 110, 210. That is, it should be understood that the strain induced in the web 101, 201 by the web bending process 102, 202 can match, reduce or reverse the strain that will be induced by the curing process 112, 212. For example, in some applications, a very slight curl in the multi-layer web 114, 214 may be desirable, such that the curl induced by curing the coating 110, 210 needs to be reduced but not cancelled. In some applications, a multi-layer web 114, 214 that curls in the direction opposite the coating 110, 210 may be desirable (e.g., a multi-layer web 114 that at least partially maintains the curl illustrated in the coated web 108 in FIG. 2 after the curing process 112).

The web bending process 102, 202 causes tensile strains on one side of the web 101, 201 and compressive strains on the opposite side of the web 101, 201. A neutral axis exists between the two sides of the web 101, 201 where the strains are zero. As shown in FIG. 1, when a coating 16 shrinks upon curing, it causes strains in the web 11 that are similar to bending strains, such that a compressive strain is induced along the surface of the web 11 to which the coating 16 is coupled, and a tensile strain is induced along the surface of the web 11 opposite the coating 16. To reduce, match or reverse the bending strains induced by curing the coating 110, 210, the web 101, 201 of the present disclosure is bent to induce a strain in the web 101, 201 that opposes the strain induced by curing the coating 110, 210. Particularly, as shown in FIGS. 2 and 2A, the web bending process 102, 202 induces a tensile strain in an upper (or outer) surface of the web 101, 201 and forms a convex surface A, A'. In addition, the web bending process 102, 202 induces a compressive strain in a lower (or inner surface) of the web 101, 201 and forms a concave surface B, B'.

To match, reduce or reverse the curl induced by the curing process 112, 212, the properties of the coating 110, 210 need to be well-understood so that the web bending process 102, 202 can be controlled to pre-strain the web 101, 201 in the appropriate manner to achieve the desired multi-layer web 114, 214. The amount of pre-curl that needs to be induced in the web 101, 201 during the web bending process 102, 202 increases as the desired multi-layer web 114, 214 goes from having a slight curl in the direction of the coating 110, 210, to being substantially flat, to being curled in the direction opposite the coating 110, 210.

As shown in FIGS. 2 and 2A, both web bending process 102, 202 induce a strain in the web 101, 201 that causes the web 101, 201 to curl in the direction opposite the coating 110, 210. In other words, the pre-curl induced in the web 101, 201 by the web bending process 102, 202 defines the convex surface A, A' and the concave surface B, B' in the web 101, 201. The coating 110, 210, whether applied before or after the web 101, 201 is bent, is applied to the convex surface A, A' of the web 101, 201.

By way of further example, the multi-layer webs 114, 214 are illustrated as including two layers, the cured coating 110', 210' and the web 101, 201. However, it should be understood that the multi-layer web 114, 214 can include more than two layers, and subsequent or parallel processing can be employed to achieve such multi-layer webs. For example, the coating process 106, 206 can include additional coating steps such that additional coatings are applied to the web 101, 201 on top of the coating 110, 210 shown in FIGS. 2 and 2A, and then all coatings can be cured substantially simultaneously in the curing process 112, 212, or the curing process 112, 212 can include multiple subsequent curing steps to cure each coating in succession. Alternatively, in some embodiments, the web handling process 100, 200 can be repeated for each additional layer to achieve a multi-layer web 114, 214 having more than two layers. Such embodiments can be understood by one of ordinary skill in the art based on the teachings of the present disclosure and are within the spirit and scope of the present disclosure.

In some embodiments of the present disclosure, the second web handling process 200 does not include the coating process 206, but rather the web is provided in the form of the coated web 208. For example, a supplier can supply the coated web 208, and the remainder of the second web handling process 200 can be used to achieve a multi-layer web 214 of desired curvature.

Figure 3:
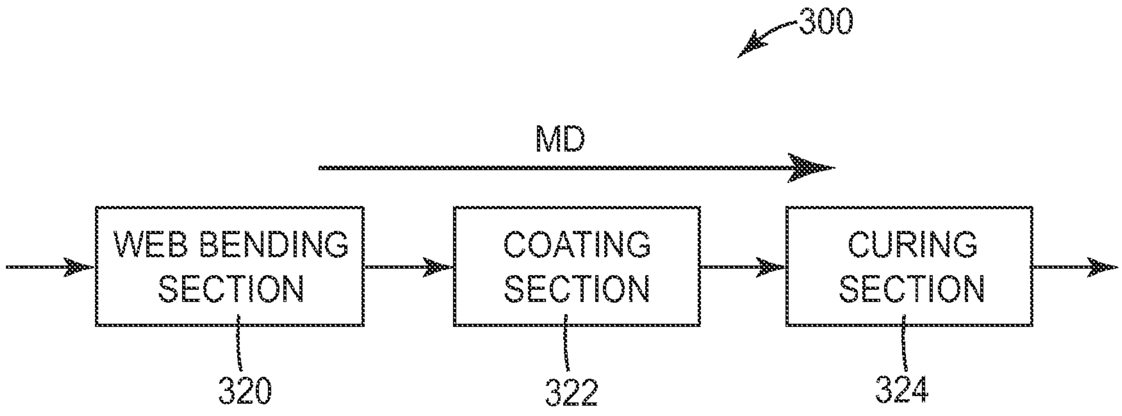
FIG. 3 is a block diagram of a web handling system according to one embodiment of the present disclosure.
Figure 3A:
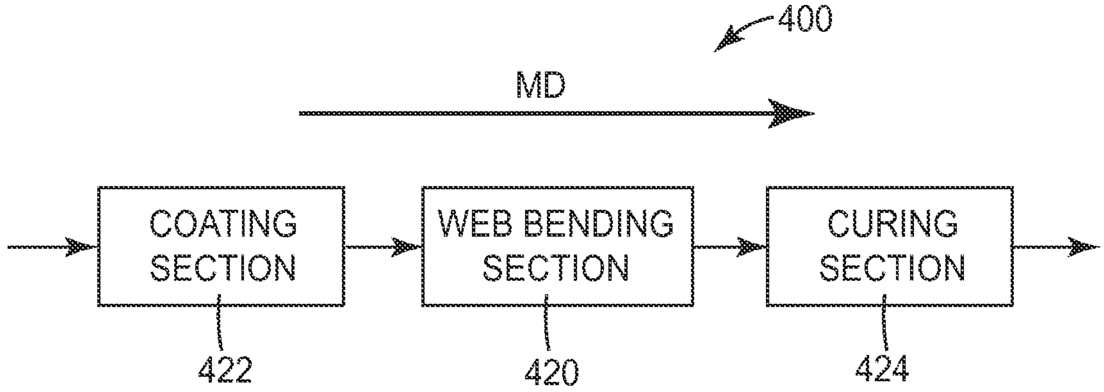
FIG. 3A is a block diagram of a web handling system according to another embodiment of the present disclosure.

FIGS. 3 and 3A illustrate web handling systems 300 and 400 for forming multi-layer webs having desired curvatures. The web handling system 300 illustrated in FIG. 3 is generally used to perform the web handling process 100 illustrated in FIG. 2, and the web handling system 400 illustrated in FIG. 3A is generally used to perform the web handling process 200 illustrated in FIG. 2A. The machine direction of each web handling system 300, 400 is illustrated by the arrow labeled "MD".

As shown in FIG. 3, the web handling system 300 includes a web bending section 320, a coating section 322, and a curing section 324. The web bending section 320 is positioned upstream of the coating section 322, which is positioned upstream of the curing section 324. In the web handling system 300, as a web is moved in the machine direction MD, it is bent in the web bending section 320 to induce a strain in the web. The web is then coated in the coating section 322 to form a coated web having a coating applied to the web. Finally, the coating is cured in the curing section 324 to form a multi-layer web of a desired curvature.

The web handling system 400 illustrated in FIG. 3A includes a web bending section 420, a coating section 422, and a curing section 324. The coating section 422 is positioned upstream of the web bending section 420, which is positioned upstream of the curing section 424. In the web handling system 400, as a web is moved in the machine direction MD, it is first coated in the coating section 422 to form a coated web having a coating applied to the web. Second, the web is bent in the web bending section 420 to induce a strain in the web. Finally, the coating is cured in the curing section 424 to form a multi-layer web of desired curvature. In some embodiments of the present disclosure, the web handling system 400 does not include the coating section 422, but rather the web is provided in the form of a coated web that can then be directed through the web bending section 420 and the curing section 424 of the web handling process 400

In FIGS. 3 and 3A, the web bending section 320, 420, the coating section 322, 422, and the curing section 324, 424 are illustrated as being discrete and separate sections. However, it should be understood that this is a schematic illustration to depict the overall layout of the web handling systems 300, 400. The web bending section 320, the coating section 322 and the curing section 324 do not need to be separate and discrete from one another, but rather it should be understood that they can overlap, as long as the web is bent prior to curing the coating.

The curing section 324, 424 can include a variety of devices and/or equipment to provide the desired type of curing for a given coating or combinations of coatings. For example, the curing section 324, 424 can include, but is not limited to, at least one of an X-ray tube, an electron beam source, a UV radiation source, a heater, and combinations thereof.

The web bending section 302, 402 can include a variety of web bending assemblies that employ a variety of web bending techniques, depending on the type of web(s) used, and the type of bending that is needed. Because bending the web induces a strain that matches, reduces or reverses the strain induced by curing a coating, the type of bending needed often depends on the type of coatings that are being used. Some coatings tend to shrink uni-directionally upon being cured and/or dried either because of the chemical make-up of the coating or because of an orientation introduced by the coating application process (e.g., some coatings include microreplicated structures from the coating application process that introduce an orientation in the machine direction or the cross-machine direction only). Some coatings, on the other hand, have a tendency to shrink in multiple directions. For example, some coatings have a tendency to shrink equally toward the center of the coating such that the coating shrinks equally in the machine direction and the cross-machine direction upon being cured. For coatings that tend to shrink uni-directionally, a uni-directional web bending process may be sufficient. However, for coatings that tend to shrink in multiple directions, a multi-directional web bending process may be necessary. The web bending section 302, 402 can include multiple web bending assemblies to achieve the desired amount of strain in the desired directions.

One example of a type of web bending that can be employed in the web bending section 320, 420 is generally referred to as reverse flexing. Reverse flexing can occur in the machine direction, the cross-machine direction, or both. Reverse flexing is described in co-owned U.S. Patent Application Publication Nos. 2005/0212173 and 2005/0246965.

Web bending assemblies employing reverse flexing can include first and second web moving assemblies having a gap therebetween. Web moving assemblies can include a variety of devices known in the art for moving a web (i.e., in the machine direction), including roller assemblies, belt assemblies, and combinations thereof. In reverse flexing, first and second web moving assemblies include rotating members (e.g., rolls/rollers, rolls/rollers upon which belts translate, or combinations thereof) that co-rotate, which means they have the same direction of rotation; or in the case of opposed belt assemblies, the opposed belt assemblies have opposite directions of linear travel. As a result of two rotating members being co-rotating, if portions of their respective rotating surfaces are placed in close proximity, the relative linear motion of the surfaces will be in opposite directions. For example, both first and second web moving assemblies could include rotating members that rotate together in a clockwise direction, and the surfaces in close proximity would have opposite directions of travel.

In some embodiments, the first and second web moving assemblies are of the same type; for example, both are roller assemblies or belt assemblies. Upon reading this disclosure, one having the knowledge and skill of one of ordinary skill in the art will appreciate that other web moving assemblies could be used in place of roller or belt assemblies.

Figure 4:
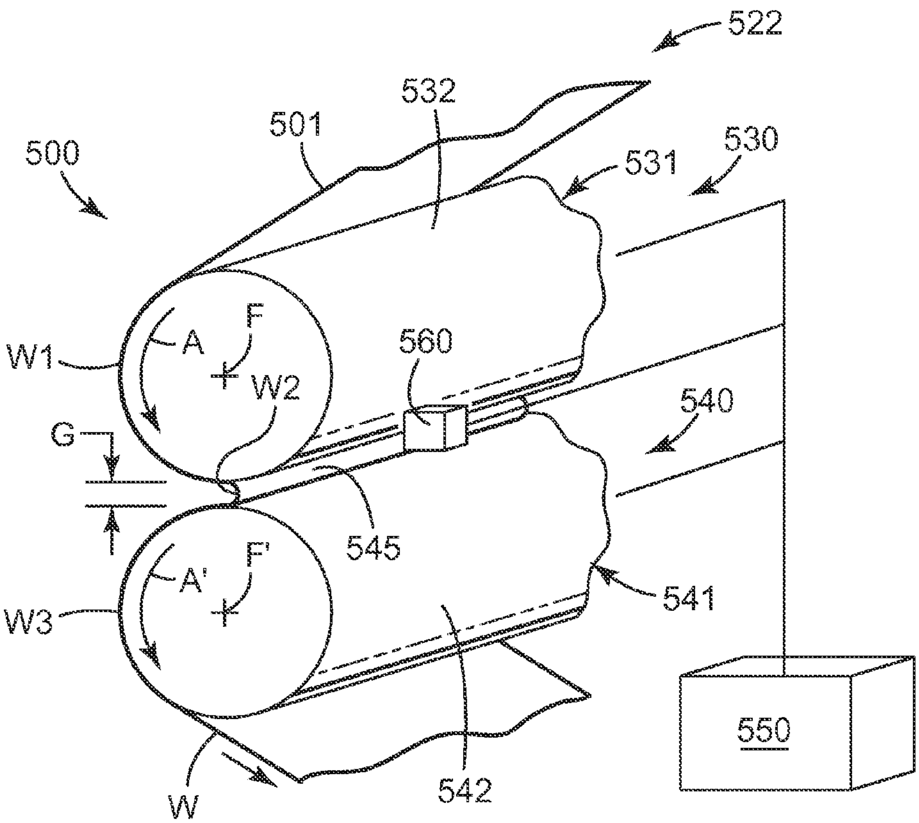
FIG. 4 is a perspective view of a web bending section according to one embodiment of the present disclosure.
Figure 4A:
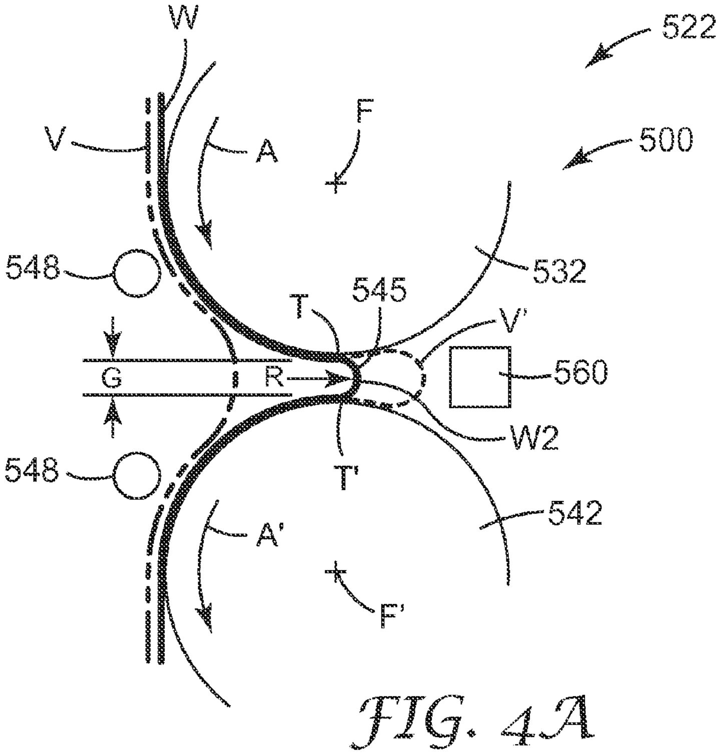
FIG. 4A is a close-up side view of the web bending section of FIG. 4

FIGS. 4 and 4A illustrate a web bending section 522 according to one embodiment of the present disclosure. The web bending section 522 includes a web bending assembly 500 that employs reverse flexing, particularly, machine-directional reverse flexing. As shown in FIGS. 4 and 4A, a web 501 is moved through and bent by the web bending assembly 500. The web bending assembly 500 includes a first web transport assembly 530 and a second web transport assembly 540. In the embodiment illustrated in FIGS. 4 and 4A, the first and second web moving assemblies 530, 540 include roller assemblies 531, 541, respectively. Each roller assembly 531, 541 includes a roller 532, 542 and means for supporting the roller 532, 542 (such as a frame connected to a roller bearing (not shown)). Each roller 532, 542 is driven and controlled by a control system 550, which is described in greater detail below. A gap G is created when the rollers are placed in close proximity. Generally, the gap G is defined by the location where the first and second rollers 532, 542 are nearest one another. In other words, the gap G is generally defined by the shortest distance separating the first and second rollers 532, 542.

The first and second rollers 532, 542 co-rotate, which means they rotate in the same rotational direction A, A' relative to a fixed axis F, F' of each roller 532, 542. A web path W is formed through the system 500. The web path W includes a first portion W1 passing over the first roller 532, a second portion W2 passing into or through the gap G, and a third portion W3 passing over the second roller 542. The second portion W2 of the web path W is controlled such that the web 501 includes a radiused portion 545 in the gap G. By passing the web 501 through the second portion W2, the web 501 can be bent and a strain induced in the web 501 in the machine direction, that is, the direction in which the web 501 travels. The amount of strain induced in the web 501 is a function of one or more of the bend radius R of the radiused portion 545 and the thickness of the web 501. The radius R can be selected to impart a predetermined amount of strain on the web 501. The radius R can vary with time, as described in greater detail below.

By bending the web 501 to produce a strain in the web 501 (i.e., a tensile strain in the outer surface and a compressive strain in the inner surface) above its plastic deformation point, which is around 2% strain for many common web materials, a permanent strain can be imparted to the bent portion of the web 501. The web 501 can be bent by varying amounts to achieve the desired pre-curl. For example, the web 501 can be bent to achieve at least about a 2% strain in the web 501 (e.g., in the outer surface of the web 501), particularly, at least about a 5% strain, and more particularly, at least about a 7% strain. As is known in the art, the percentage of strain needed will be at least partially dependent on the rate of deformation of the web 501.

To bend the web 501, the web 501 is passed over the first and second co-rotating rollers 532, 542, and through the gap G. Typically, the web 501 is held against the rollers 532, 542 by holding means such as, for example, an electrostatic pinning wire 548 (as is illustrated in FIG. 4A), air pressure or vacuum, adhesives, or engagement members, for example, hook and loop fasteners. Using the holding means allows control of where the web 501 leaves and enters points T, T' of the first and second rollers 532, 542, respectively. It also counteracts the tendency of the web 501 to move out of the gap G, such tendency being caused by the rollers 532, 542 rotating in the same direction A, A'. One example of a holding means that can be used to hold the web 501 against the rollers 532, 542 is a charging bar with a trade designation TETRIS, available from SIMCO Industrial Static Control, Hatfield, Pa.

Generally, the web 501 travels around the first roller 532 and is peeled off at point T in the vicinity of the gap G. The web 501 is then bent back on itself defining the radius R (at the radiused portion 545) and reattached at a point T' on the second roller 542. In the embodiment illustrated in FIGS. 4 and 4A, the location of the radiused portion 545 is controlled by a closed loop control system 550, which senses the location of the radiused portion 545 and, in response, controls the relative velocity of the two rollers 532, 542. Generally, the control system 550 can be a suitable electronic device, such as, for example, a programmable logic controller ("PLC"), a personal computer ("PC"), and/or other industrial/personal computing device. As such, the control system 550 may include both hardware and software components, and is meant to broadly encompass the combination of such components.

The size of the radius R of the web 501 can be varied by controlling the size of the gap G and the distance that the web 501 extends into or through the gap G. In one exemplary embodiment, the web radius R can be controlled by using a sensor 560 to sense the position of the radiused portion 545 in the gap G (for a fixed gap dimension), since the curvature (i.e., radius R) of the radiused portion 545 will depend on at least the distance that the radiused portion 545 extends into the gap G, and the tangent points T, T' at which the web 501 loses contact with the rollers 532, 542. Once the relationship of the web curvature of the radiused portion 545 is determined, a sensor 560 is used to measure the position of the radiused portion 545 of the web 501 while in the gap G. The sensor 560 can then send a signal to the control system 550, which can then adjust operation of the system to position the radiused portion 545 to obtain the desired curvature.

For example, if the sensor 560 detects that the radiused portion 545 has moved too far into the gap G, it can adjust the relative speed of the rollers to reposition the radiused portion 545 in the gap G. One way would be to increase the speed of the second roller 542 relative to the first roller 532, which would tend to move the radiused portion 545 towards the gap G. Alternatively, the speed of the first roller 532 could be decreased relative to the speed of the second roller 542 until the radiused portion 545 is repositioned as desired. Upon reading this disclosure, other means (e.g., a pacing roll and a follower roll) for properly positioning the radiused portion 545 of the web 501 in the gap G will become apparent to an artisan having ordinary knowledge and skill in the art.

In some embodiments, it may be desirable that the radiused portion 545 of the web 501 extend through the narrowest region between the first and second rollers 532, 542 (i.e., where the distance between the first and second rollers 532, 542 is equal to the gap G), as illustrated by web path W in FIGS. 4 and 4A. However, it may be desirable for the radiused portion 545 to extend into the region between the first and second rollers 532, 542 to a lesser or greater extent and not through the point at which the rollers 532, 542 are nearest to one another, as shown in FIG. 4A by web paths V and V', which are shown in phantom and dashed lines, respectively. When the web moving assemblies 530, 540 include roller assemblies, the size of the radiused portion 545 can depend on the amount that the radiused portion 545 extends towards, into or through the gap G, as well as the gap size (e.g., the distance between points T and T'). However, in embodiments in which the web moving assemblies 530, 540 include belt assemblies, the size of the radiused portion 545 can depend predominantly on the gap size, as described below.

Figure 5:
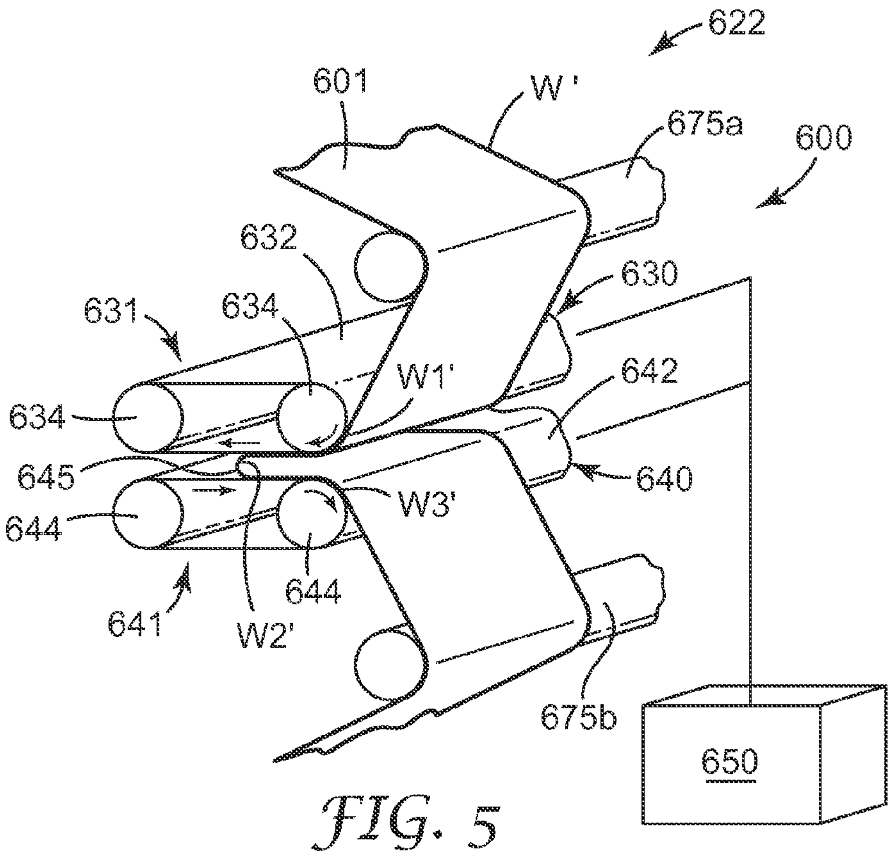
FIG. 5 is a perspective view of a web bending section according to another embodiment of the present disclosure.
Figure 5A:
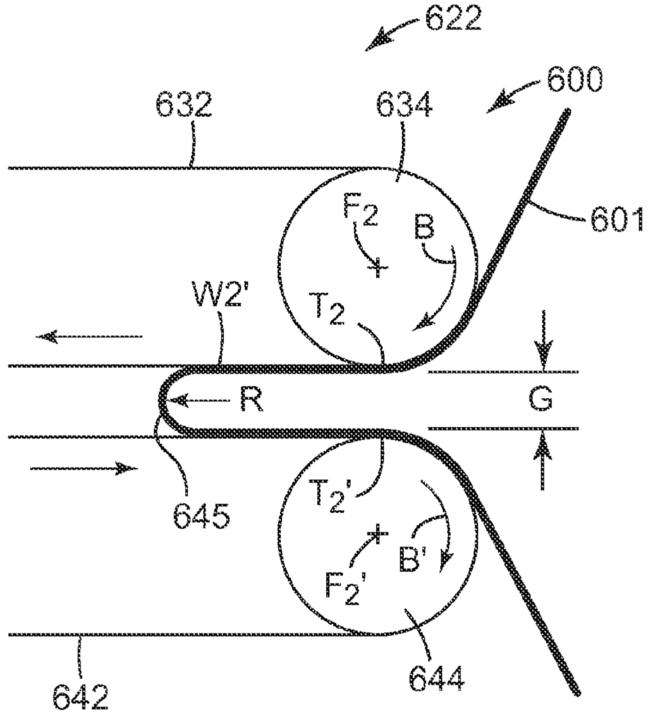
FIG. 5A is a close-up side view of the web bending section of FIG. 5.

FIGS. 5 and 5A illustrate another web bending section 622 according to the present disclosure, wherein like numerals represent like elements. The web bending section 622 includes a web bending assembly 600. The web bending assembly 600 shares many of the same elements and features described above with reference to the illustrated embodiment of FIGS. 4 and 4A. Accordingly, elements and features corresponding to elements and features in the illustrated embodiment of FIGS. 4 and 4A are provided with the same reference numerals in the 600 series. Reference is made to the description above accompanying FIGS. 4 and 4A for a more complete description of the features and elements (and alternatives to such features and elements) of the embodiment illustrated in FIGS. 5 and 5A.

As shown in FIGS. 5 and 5A, a web 601 is moved through and bent by the web bending assembly 600. The web bending assembly 600 includes a first web transport assembly 630 and a second web transport assembly 640. In the embodiment illustrated in FIGS. 5 and 5A, the first and second web moving assemblies 630, 640 are belt assemblies 631, 641. Each belt assembly 631, 641 includes a driven belt 632, 642, a set of rollers 634, 644 which rotate to cause translation of the belt 632, 642 about the rollers 634, 644, and means for supporting the belt assembly 631, 641 (such as a frame connected to rollers 634, 644 (not shown)). Each belt 632, 642 is driven and controlled by a control system 650, as described below.

As shown in FIG. 5A, the rollers 634, 644 co-rotate in the same rotational direction B, B' relative to a fixed axis $F_2$, $F_2'$. As shown in FIG. 5, a web path W' is formed through the system 600. The web path W' includes a first portion W1' passing over the first belt 632, a second portion W2' passing through the gap G', and a third portion W3' passing over the second belt 642. The second portion W2' of the web path W' is controlled to form a radiused portion 645. By passing the web 601 through the radiused portion 645, the web 601 can be bent and a desired strain induced in the web 601 in the machine direction.

As long as the radiused portion 545 of the web 601 is located between the respective ends of the first and second belts 632, 642 forming the gap G, the curvature of the radiused portion 545 is only a function of the size of the gap G, since the tangents $T_2$, $T_2'$ at which the web 601 leaves the first belt 632 and rejoins the second belt 642 is constant between the ends of the first and second belts 632, 642, as long as the belts are substantially parallel along their respective flat portions. Thus, once the radiused portion 645 is formed while the system is operating, the system can be run without a sensor for detecting the position of the radiused portion 645 of the web 601 in the gap G. However, some drift can occur in the position of the radiused portion 645 of the web 601 in the gap G. Thus, a sensor can be used to detect the position of the radiused portion 645 to keep the radiused portion 645 positioned within the gap G. Such a sensor may, however, require less sensitivity than the sensor 560 used with the web bending assembly 500 illustrated in FIGS. 4 and 4A employing roller assemblies 631, 641.

The embodiments illustrated in FIGS. 4-5A and described above are particularly well suited for inducing a strain that varies as a function of the machine direction but which is relatively constant in the cross-machine direction. As described above, uni-directional (e.g., machine direction only) bending may be suitable for some applications, but in other embodiments, multi-directional bending may be necessary to obtain a multi-layer web of desired curvature.

Figure 6:
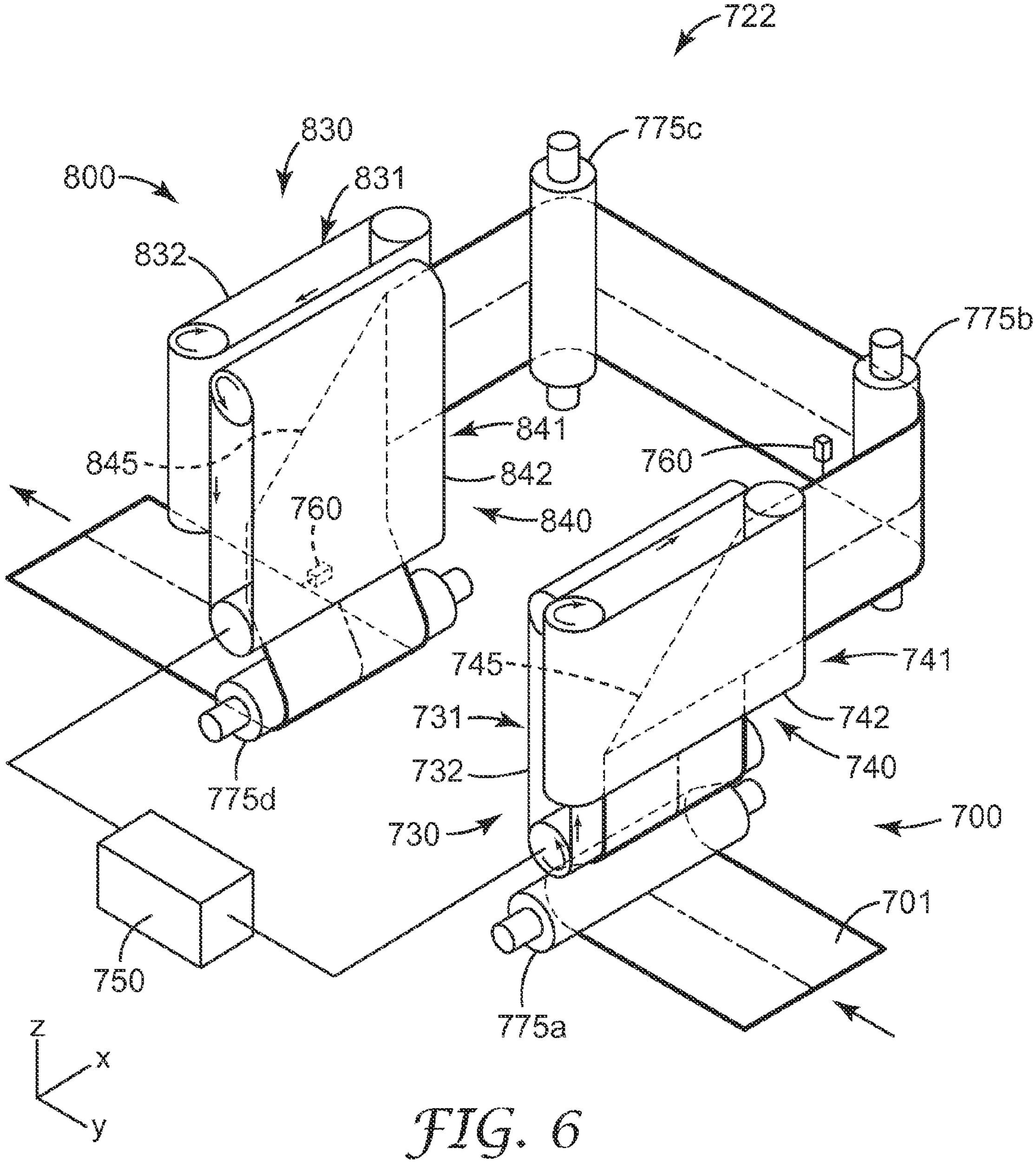
FIG. 6 is a perspective view of a web bending section according to another embodiment of the present disclosure.
Figure 6A:
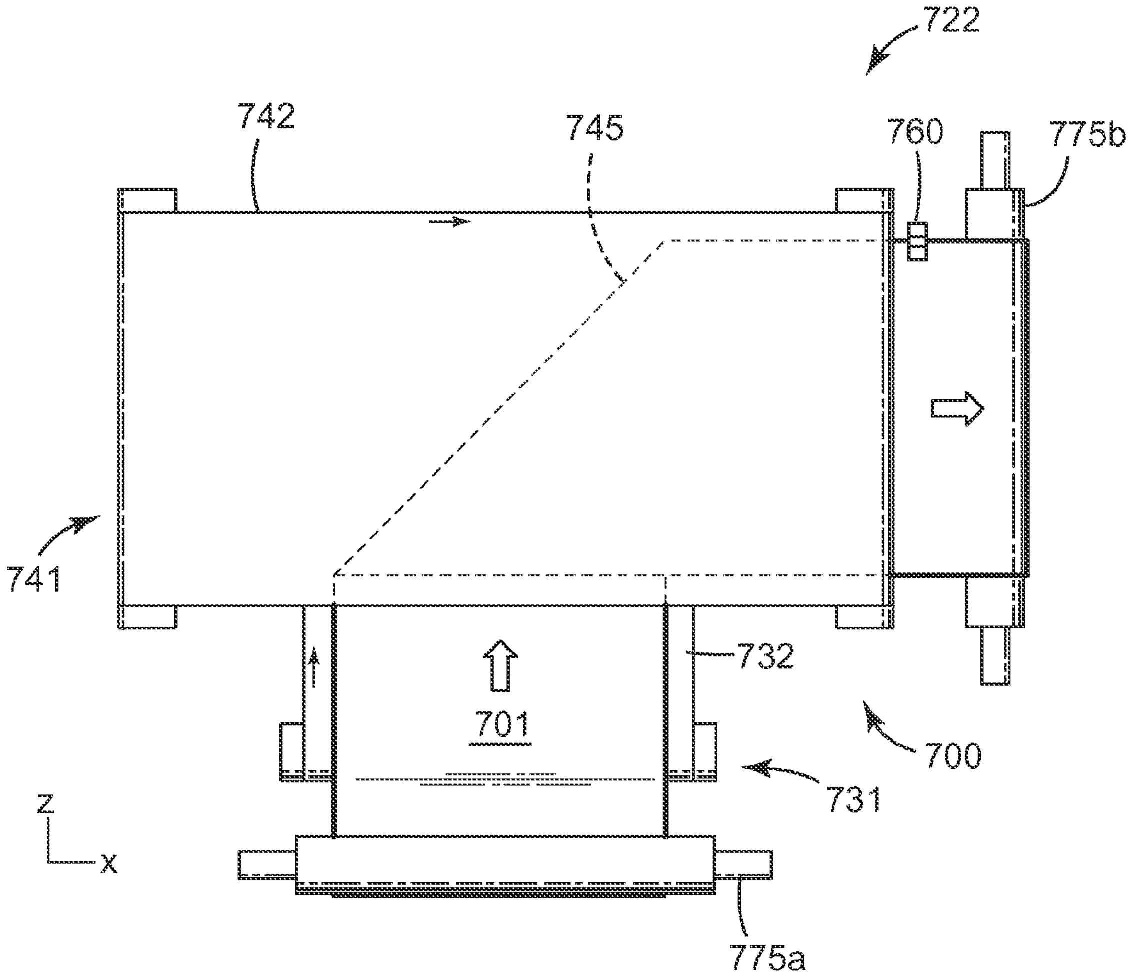
FIG. 6A is a close-up side view of the web bending section of FIG. 6.

FIGS. 6 and 6A illustrate a web bending section 722 according to one embodiment of the present disclosure. The web bending section 722 includes a first web bending assembly 700 and a second web bending assembly 800 according to the present disclosure, wherein like numerals represent like elements. The web bending assemblies 700 and 800 share many of the same elements and features described above with reference to the illustrated embodiment of FIGS. 4-5A. Accordingly, elements and features corresponding to elements and features in the illustrated embodiment of FIGS. 4-5A are provided with the same reference numerals in the 700 and 800 series. Reference is made to the description above accompanying FIGS. 4-5A for a more complete description of the features and elements (and alternatives to such features and elements) of the embodiment illustrated in FIGS. 6 and 6A.

As shown in FIGS. 6 and 6A, a web 701 is moved through and bent by the web bending section 722. Each web bending assembly 700, 800 includes a pair of web moving assemblies 730, 740 and 830, 840, respectively. Each web transport assembly 730, 740, 830, 840 is similar to one of the web moving assemblies 630, 640 shown in FIGS. 5 and 5A and described above. That is, each web transport assembly 730, 740, 830, 840 includes a belt assembly 731, 741, 831, 841, respectively. Each belt assembly 731, 741, 831, 841 includes a belt 732, 742, 32, 842, respectively.

The difference between the web transport assembly pairs 730, 740 and 830, 840 of FIGS. 6 and 6A and the web moving assemblies 630, 640 illustrated in FIGS. 5 and 5A is that the opposed web moving assemblies (e.g., 730, 740) are oriented at an angle with respect to one another, such that the respective opposing belts (e.g., 732, 742) move the web in directions that are oriented at an angle with respect to one another. Particularly, in the embodiment illustrated in FIGS. 6 and 6A, each set of opposing belts (e.g., 732, 742) is oriented substantially perpendicularly with respect to one another. However, it should be understood that other angles of orientation can be employed to induce the desired strain in the web 701.

By orienting opposing belts with respect to one another, a strain can be induced in the web 701 in a cross-machine direction. By including two web bending assemblies 700, 800, the web 701 can be strained in a first cross-machine direction by the first web bending assembly 700 and strained in a second cross-machine direction by the second web bending assembly 700. In some embodiments, the first cross-machine direction is substantially opposite that of the second cross-machine direction, which can create a more isotropic stress distribution in the web 701. For simplicity and clarity, the following description refers only to the first web bending assembly 700, but it should be understood that the same description applies equally to the second web bending assembly 800.

At the first web bending assembly 700, the web 701 contacts the first belt 732 and travels into the gap between the first and second belts 732, 742 (e.g., see gap G in FIGS. 5 and 5A) where the web 701 is then flipped and turned about 90 degrees. The web 701 then contacts the second belt 742. The web 701 (as illustrated in FIGS. 6 and 6A) is formed into a radiused portion 745 in the gap. The size of the radius of the radiused portion 745 controls the amount of strain induced in the web 701, as discussed above.

Because the belts 732 and 742 are oriented substantially perpendicularly with respect to one another, the radiused portion 745 of the web 701 (and radiused portion 845 in the second web bending assembly 800) is oriented at an angle of about 45 degrees with respect to each of the belts 732, 742, and as a result, at a 45-degree angle with respect to the machine direction and the cross-machine direction. The angle of the radiused portion 745 induces a machine-directional and a cross-machine-directional strain in the web 701, and described below.

FIGS. 5-5A and 6-6A include additional web moving assemblies 675 (i.e., 675*a* and 675*b*) and 775 (i.e., 775*a*, 775*b*, 775*c* and 775*d*), respectively, that direct the web into and out of the web bending assemblies 600, 700 and 800. Specifically, as shown in FIGS. 6 and 6A, the web moving assemblies 775*a* and 775*b* direct the web 701 into and out of the first web bending assembly 700, respectively, and the web moving assemblies 775*c* and 775*d* direct the web 701 into and out of the second web bending assembly 800. The additional web moving assemblies 675 and 775 are illustrated as being rollers, but it should be understood that a variety of web moving assemblies, and combinations thereof, can be used directly upstream and downstream of the web bending assemblies 600, 700 and 800 without departing from the spirit and scope of the present disclosure.

The web path created in the first web bending assembly 700 creates a tendency for the web 701 to creep or "walk" along the belt 732 in a direction perpendicular to the line of travel. To minimize the effect of creep, web edge sensors 760 can be used to the laterally position the web 701 exiting both web bending assemblies 700 and 800. Lateral control is accomplished by adjusting the relative speed of belts 732 and 742 on the first web bending assembly 700 and belts 832 and 842 on the second web bending assembly 800. Control system 750, based on feedback from the web edge sensors 760, independently can adjust relative belt speeds.

Figure 7:
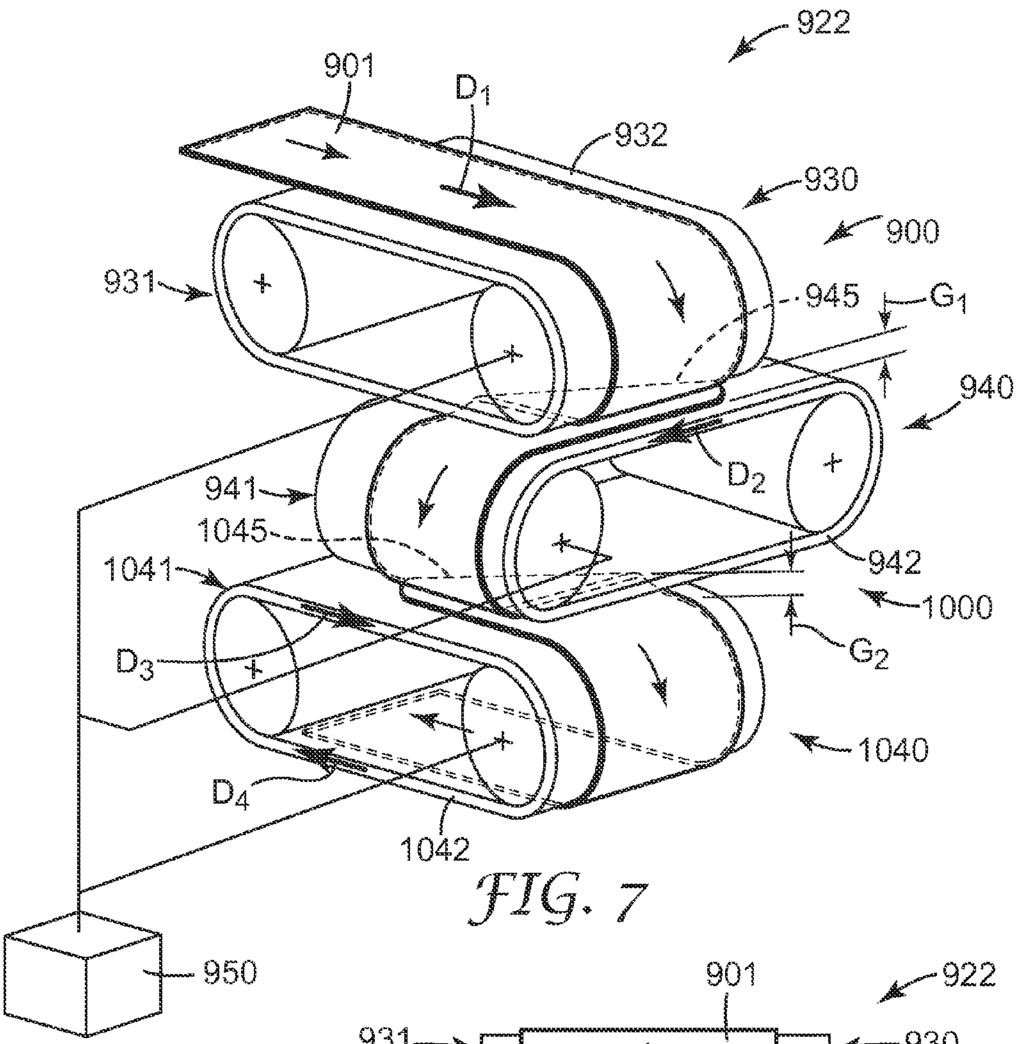
FIG. 7 is a perspective view of a web bending section according to another embodiment of the present disclosure.
Figure 7A:
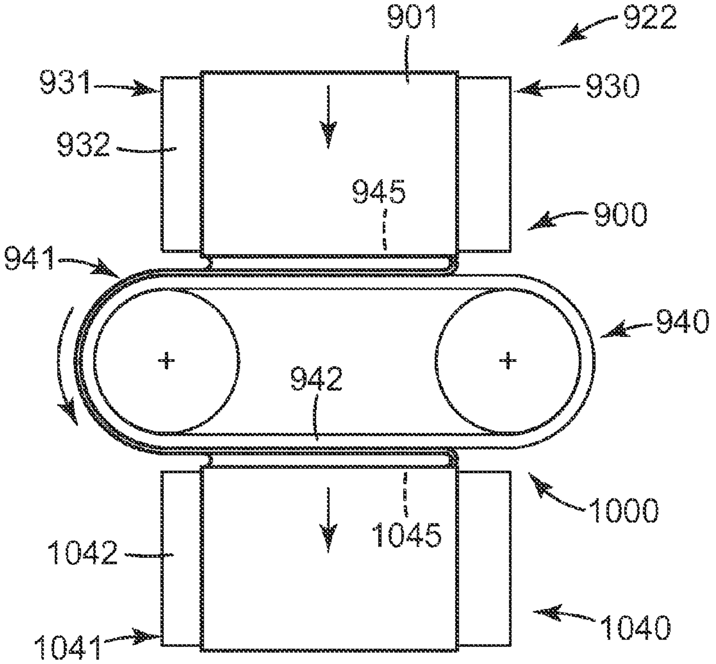
FIG. 7A is a close-up right side view of the web bending section of FIG. 7.

FIGS. 7 and 7A illustrate a web bending section 922 according to another embodiment of the present disclosure. The web bending section 922 includes a first web bending assembly 900 and a second web bending assembly 1000 according to the present disclosure, wherein like numerals represent like elements. The web bending assemblies 900 and 1000 share many of the same elements and features described above with reference to the illustrated embodiment of FIGS. 4-6A. Accordingly, elements and features corresponding to elements and features in the illustrated embodiment of FIGS. 4-6A are provided with the same reference numerals in the 900 and 1000 series. Reference is made to the description above accompanying FIGS. 4-6A for a more complete description of the features and elements (and alternatives to such features and elements) of the embodiment illustrated in FIGS. 7 and 7A.

As shown in FIGS. 7 and 7A, a web 901 is moved through and bent by the web bending section 922. Each web bending assembly 900, 1000 includes a pair of web moving assemblies, however, the difference between the web bending assemblies 900 and 1000 of FIGS. 7 and 7A and the web bending assemblies 700 and 800 of FIGS. 6 and 6A is that the web bending assemblies 900 and 1000 are directly adjacent one another (i.e., the second web bending assembly 1000 is directly downstream of the first web bending assembly 900).

Three web moving assemblies define the web bending assemblies 900 and 1000. Specifically, the first web bending assembly 900 includes a first web transport assembly 930 and a second web transport assembly 940, and the second web bending assembly 1000 includes the second web transport assembly 940 and a third web transport assembly 1040. Each web transport assembly 930, 940 and 1040 is substantially similar to one of the web moving assemblies 630, 640 shown in FIGS. 5 and 5A and described above. Particularly, each web transport assembly 930, 940, 1040 includes a belt assembly 931, 941, 1041, respectively, which each includes a belt 932, 942, 1042, respectively. Each belt 932, 942, 1042 is driven and controlled by a control system 950. As described above, sensors (e.g., sensor 560 in FIGS. 4-4A or sensor 760 in FIGS. 6-6A) or other control elements can be used in combination with the control system 950 to achieve the desired operation of the web bending section 922.

Each pair of web moving assemblies (e.g., 930 and 940, or 940 and 1040) is oriented at an angle with respect to one another, such that the respective opposing belts (e.g., 932 and 942, or 942 and 1042) are oriented at an angle with respect to one another. In addition, each successive belt 932, 942, 1042 is oriented at an angle with respect to the belt directly upstream or downstream of it. Particularly, in the embodiment illustrated in FIGS. 7 and 7A, each successive belt 932, 942, 1042 is oriented substantially perpendicularly with respect to the belt directly upstream or downstream of it.

When entering the first web bending assembly 900, the web 901 contacts the first belt 932 and travels into a first gap $G_1$ between the first and second belts 932, 942 where the web 901 is then flipped and turned about 90 degrees. The web 901 then contacts the second belt 942 and travels into a second gap $G_2$ between the second and third belts 942, 1042, where the web 901 is flipped and turned about 90 degrees again. The web 901 then contacts the third belt 1042 and travels along the underside of the third belt 1042 to exit the second web bending assembly 1000.

As shown in FIGS. 7 and 7A, the web 901 enters the web bending section 922 moving in a first direction $D_1$ along the first belt 932. As the web 901 is flipped and turned in the first gap $G_1$, it begins traveling along the second belt 942 and moves in a second direction $D_2$, which is substantially perpendicular to the first direction $D_1$. As the web 901 is flipped and turned in the second gap $G_2$, it begins moving along the third belt 1042 and moves in a third direction $D_3$, which is substantially perpendicular to the second direction $D_2$ and substantially parallel to the first direction $D_1$. As the web 901 continues traveling along the third belt 1042, it travels along the underside of the third belt 1042 and moves in a fourth direction $D_4$, which is substantially opposite the first direction $D_1$ and the third direction $D_3$ (i.e., oriented about 180 degrees with respect to the first direction $D_1$ and the third direction $D_3$) and substantially perpendicular to the second direction $D_2$.

Thus, in the embodiment illustrated in FIGS. 7 and 7A, the web 901 enters the web bending section 922 in the first direction $D_1$ and exits the web bending section 922 in the fourth direction $D_4$, which is opposite the first direction $D_1$. However, it should be understood to those of ordinary skill in the art that instead of the web 901 traveling along the third belt 1042 and ending up moving in the fourth direction $D_4$, the third belt 1042 can instead extend further in the third direction $D_3$ and cause the web 901 to continue moving further in the third direction $D_3$ to downstream processes. Such embodiments are within the spirit and scope of the present disclosure. As a result, web movement through the web bending section 922 can also be described as follows: the web 901 enters the first web bending assembly 900 moving in the first direction $D_1$, enters the second web bending assembly 1000 moving in the second direction $D_2$ (i.e., in a direction substantially perpendicular to the first direction $D_1$), and exits the second web bending assembly 1000 moving in the third direction $D_3$ (i.e., parallel to the first direction $D_1$).

The web 901 is formed into a first radiused portion 945 in the first gap $G_1$ and a second radiused portion 1045 in the second gap $G_2$. The size of the radius controls the amount of strain induced in the web 901. Because the first and second belts 932 and 942 (and second and third belts 942, 1042) are oriented substantially perpendicularly with respect to one another, the first radiused portion 945 of the web 901 (and the second radiused portion 1045 in the second web bending assembly 1000) is oriented at an angle of about 45 degrees with respect to each of the belts 932, 942 (and 942, 2042), and as a result, at a 45-degree angle with respect to the machine direction and the cross-machine direction. The angle of the radiused portion 945 induces a machine-directional and a cross-machine-directional strain in the web 901.

By passing the web 901 through the first and second web bending assemblies 900, 1000, the web 901 is first bent at a 45-degree angle in one direction and then at a 45-degree angle in the opposite direction to achieve a more isotropic stress distribution in the web 901. As a result, the web bending section 922 can be used to pre-strain the web 901 substantially equally in the machine direction and the cross-machine direction to at least partially counteract the strain induced in the resulting multi-layer web by a coating that shrinks substantially equally in the machine direction and the cross-machine direction upon being cured and/or dried.

While the belts 932, 942 and 1042 are illustrated in FIGS. 7 and 7A as being oriented substantially perpendicularly with respect to one another causing the radiused portions 945 and 1045 of the web 901 to be flipped at an angle of 45 degrees, one of ordinary skill in the art will understand that other angles of orientation can be employed. That is, the belts 932, 942 and 1042 can be oriented at other angles with respect to one another to flip the web 901 at angles other than 45 degrees to induce a strain in the desired direction in the web 901. The desired strain direction will depend on at least the type of coating to be used (and the direction and amount of strain induced by curing the coating) and the desired curvature of the resulting multi-layer web.

An advantage of the web bending assemblies 500, 600, 700, 800, 900 and 1000 is that a web can be bent without any contact of the surface of the web that is not in contact with the web handling assemblies 500, 600, 700, 800, 900 and 1000. That is, a web path can be created such that the coated side of a coated web does not contact the surface of any web handling equipment. The web is then passed through a web path having a radiused portion. Since the coated side of the web does not contact rollers or belts, there is a reduction in the chance that the coated side of the web will be damaged by contact. Also, since the coated side does not contact any surfaces in the system, the amount of wear is reduced or eliminated (e.g., if the coating is abrasive).

The size (or curvature) of the radiused portion controls the amount of strain that is induced in the web. The radiused portion is sized so that the web material is strained to just beyond its elastic point, thereby insuring the strain induced is a permanent strain. The particular size of the radius will depend on many factors, such as the material properties and thickness of the web. Determining the radius to which the web must be bent to create permanent strain is within the skill and knowledge of one having ordinary skill in the art. The yield strain, that is, the strain at the point where the web undergoes plastic deformation, can be determined by routine testing, such as that done using a mechanical tester, for example Model 4505, available from INSTRON Co., of Canton, Mass.

Figure 8:
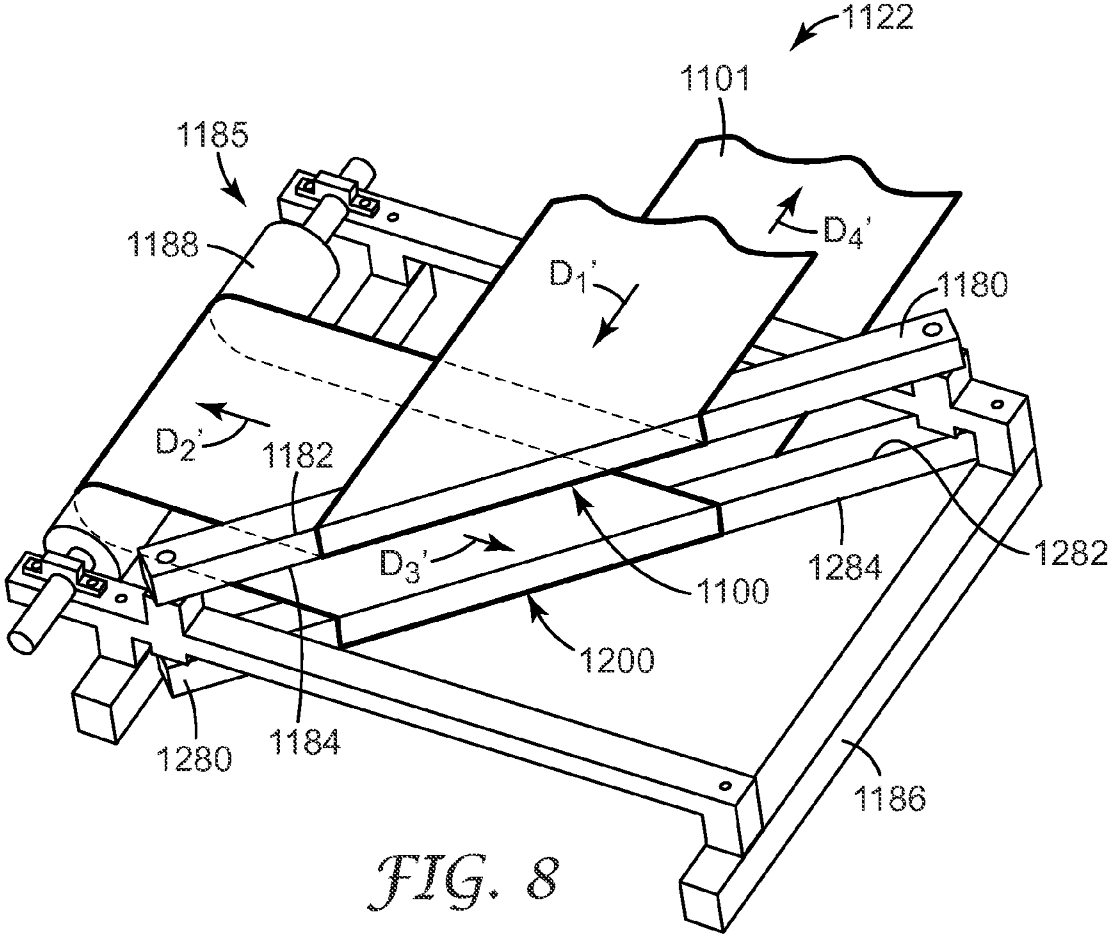
FIG. 8 is a perspective view of a web bending section according to another embodiment of the present disclosure.
Figure 8A:
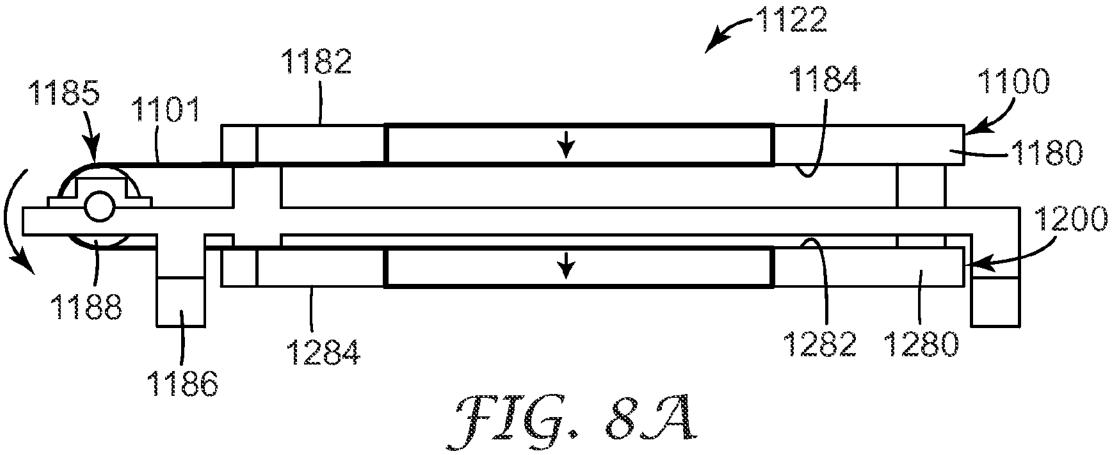
FIG. 8A is a close-up front view of the web bending section of FIG. 8.

FIGS. 8 and 8A illustrate a web bending section 1122 according to another embodiment of the present disclosure. The web bending section 1122 bends the a web 1101 in a similar manner as that described above and illustrated in FIGS. 7 and 7A, except that the web bending section 1122 does not use reverse flexing to bend the web 1101. Instead, the web bending section 1122 bends the web 1101 by moving the web 1101 over a small radius (i.e., a radius that is small relative to the thickness of the web 1101). Moving the web 1101 over a small radius can include, for example, sliding the web over a sharp edge, moving the web over a rotating rod of a small diameter, and combinations thereof. Moving the web 1101 over a small radius can create scratches and debris on the web 1101. As a result, when bending fragile or delicate webs, reverse flexing may be more desirable.

The web bending section 1122 includes a first web bending assembly 1100 and a second web bending assembly 1200. Each web bending assembly 1100, 1200 includes a bar 1180, 1280. Each bar 1180, 1280 defines a first edge 1182, 1282 and a second edge 1184, 1284 over which the web 1101 is passed to induce a strain in the web 1101. While the bars 1180, 1280 are illustrated as having two edges over which the web 1101 is passed, it should be understood that one or more than two edges can be used without departing from the spirit and scope of the present disclosure. Also, the edges (or sharp radii) over which the web 1101 is passed need not be formed by a bar or other similar structure, but rather can be defined by a variety of objects or devices, including, for example, a sheet-like element, or any other suitable object or device that defines an adequate edge.

The web bending section 1122 further includes a web transport assembly 1185 over which the web 1101 travels between the first web bending assembly 1100 and the second web bending assembly 1200. In addition, the web bending section 1122 includes a frame 1186 for supporting the web bending assemblies 1100, 1200 and the web transport assembly 1185. In the embodiment illustrated in FIGS. 8 and 8A, the web transport assembly 1185 includes a roller 1188; however, it should be understood that other web transport assemblies (e.g., a belt, or a combination of multiple rollers, belts, or combinations thereof) can be used to transport the web 1101 between the first and second web bending assemblies 1100, 1200. In addition, the frame 1186 is shown by way of example only, but it should be understood that a variety of structures and supporting elements can be used in the frame 1186 without departing from the present disclosure.

As shown in FIG. 8, the bars 1180, 1280 are oriented at an angle of about 45 degrees with respect to the machine direction (and the cross-machine direction). Similar to the embodiments illustrated in FIGS. 6-6A and 7-7A, the web 1101 is first bent at a 45-degree angle in one direction as it passes over the first and second edges 1182, 1184 of the first web bending assembly 1100, and then at a 45-degree angle in the opposite direction as it passes over the first and second edges 1282, 1284 of the second web bending assembly 1200. In other words, the absolute value of each of the angles at which the web 1101 is bent is 45 degrees, but they are opposite one another, such that the sum of the angles equals zero. As a result, the web 1101 is bent in the machine direction and the cross-machine direction substantially equally, such that the web 1101 has a substantially isotropic stress distribution when exiting the web bending section 1122.

The web bending assemblies 1100, 1200 are stacked on top of one another, which reduces the footprint of the web bending section 1122; however, it should be understood that the web bending assemblies 1100, 1200 can instead be arranged in a variety of other manners without departing from the spirit and scope of the present disclosure. For example, the web bending assemblies 1100, 1200 can instead be positioned side-by-side.

The web 1101 enters the web bending section 1122 from upstream processes moving in a first direction $D_1'$ and then enters the first web bending assembly 1100. The web 1101 is then passed over the first and second edges 1182, 1184 of the bar 1180 at an angle of about 45 degrees with respect to the first direction $D_1'$ (i.e., the machine direction). The web 1101 is then flipped (i.e., by being passed over and under the bar 1180) and turned by about 90 degrees, such that the web 1101 begins moving in a second direction $D_2'$, which is substantially perpendicular to the first direction $D_1'$. The web 1101 is then moved by the web transport assembly 1185, and particularly, is passed over the roller 1188 and enters the second web bending assembly 1200 moving in a third direction $D_3'$, which is substantially opposite the second direction $D_2'$ and substantially perpendicular to the first direction $D_1'$. The web 1101 is then passed over the first and second edges 1282, 1284 of the bar 1280 at an angle of about −45 degrees with respect to the third direction $D_3'$. The web 1101 is flipped (i.e., by being passed over and under the bar 1280) and turned by about −90 degrees, such that the web 1101 begins moving in a fourth direction $D_4'$, which is substantially opposite the first direction $D_1'$ and substantially perpendicular to the second and third directions $D_2'$ and $D_3'$.

The following working examples are intended to be illustrative of the present disclosure and are not meant to be limiting.

EXAMPLES

Example 1

A 25-μm thick biaxially oriented (isotropic) polyethylene terephthalate (PET) film, having an elastic modulus in the machine direction of about 5000 MPa, was conveyed around a casting roll. This casting roll had grooves in the form of right triangular projections 25 μm high, in a continuous repeat, oriented in a circumferential direction. An acrylate resin having an integral UV initiator was extruded into the nip between the PET film and the casting roll to form a coating on the PET film. The coating was then exposed to ultraviolet radiation through the PET film sufficient to fully polymerize the acrylate resin into acrylic prisms 25 μm high and continuous in the machine direction of the PET film, thereby forming a multilayer web comprising the PET film and the cured acrylate. The resulting cured coating was found to have an elastic modulus of 2000 MPa in the machine direction.

The multi-layer web was then assessed for flatness using the curl gauge disclosed in the paper "Measurement of Web Curl" published in the Proceedings of the Applied Webhandling Conference, AIMCAL 2006, which is incorporated by reference herein. The multi-layer web was found to have a machine direction radius of curvature of 0.06 m, or a curvature of 16.7 $m^{-1}$. This would correspond to a curing stress in the coating of 3.1 MPa, according to the equations developed by E. M. Corcoran, "Determining Stresses in Organic Coatings Using Plate Beam Deflection," J. Paint Technol., 41, 635-40 (1969), which is incorporated herein by reference.

Example 2

A second experiment was performed generally similar to Example 1, except that before the coating step, the PET film was pre-curled using a web bending section similar to the web bending section 522 shown in FIGS. 4 and 4A. The web bending section was set to impart to the PET film a reverse curl with a radius of curvature of 0.3 m or a curvature of 3.3 $m^{-1}$. The coating, which was applied to the convex surface of the pre-curled web, and curing steps were then performed as described in Example 1. The resulting multi-layer web was observed to be substantially flat, and was found to have a radius of curvature of 0.6 m (and a curvature of 1.6 $m^{-1}$), as determined using the curl gauge described in Example 1.

Example 3

Standard die coating techniques were used to coat a 75-μm-thick polyethylene terephthalate (PET) base film, having an elastic modulus in the machine direction of about 5000 MPa. The coating composition was a photopolymerizable dispersion with solids consisting mainly of 51% by weight pentaerythritoltriacrylate ("SR-444" from Sartomer Company, Inc. of Exton, Pa.) and 37% by weight reaction product of colloidal silica ("Nalco 2327" from Nalco Company of Naperville, Ill.) and 3-trimethoxysilylpropyl methacrylate ("A174" from Momentive Performance Materials of Wilton, Conn.). Other solid additives in PETA were 8% by weight n,n-dimethylacrylamide ("NNDMA" from Sigma-Aldrich Company of St. Louis, Mo.), 2.4% by weight 1-hydroxy-cyclohexyl-phenylketone ("Irgacure 184 from Ciba Specialty Chemicals of Newport, Del.), 2% by weight bis (pentamethyl-1,2,2,6,6 piperidinyl-4) decanoate ("Tinuvin 292" from Ciba Specialty Chemicals of Newport, Del.), 50 ppm phenothiazine (Cytec Industries, Inc. of West Patterson, N.J.) and 400 ppm 2,6-di-tert-butyl-p-cresol (Merisol USA, LLC of Houston, Tex.). The coating composition was prepared at 30 wt. % solids from a dispersion of approximately 50 wt. % solids in a 2-propanol diluent. Specifically, the coating composition was prepared according to column 10, lines 25-39 and Example 1 of U.S. Pat. No. 5,677,050 to Bilkadi, et. al, which is incorporated herein by reference.

The coated film was passed through a heated air impingement drying process to remove the organic solvent, leaving a 10-μm-thick layer of uncured acrylate hardcoat. The coating was cured by ultraviolet radiation to a level that produced an elastic modulus of 1200 MPa and an effective shrinkage of 0.9%.

The coated film was then assessed for flatness using the curl gauge described in Example 1 and found to have both a machine direction and cross machine direction radii of curvature of about 0.05 m, or expressed differently, curvatures of 20 $m^{-1}$. This would correspond to a curing stress in the coating of 14 MPa, according to the equations developed by E. M. Corcoran, J. Paint Technol. 41 (1969).

Example 4

A second experiment was performed generally similar to Example 3, except that before the coating step, the PET film was pre-curled using a web bending apparatus similar to the web bending apparatus 1122 shown in FIGS. 8 and 8A. The web bending apparatus was set to impart to the PET film a reverse curl with a radius of curvature of curvature of 0.04 m, or a curvature of 25 $m^{-1}$. The coating and curing steps were then performed as described in Example 3. The resulting multi-layer web was observed to lie substantially flat in both the machine and cross machine directions.

Example 5

Figure 9:
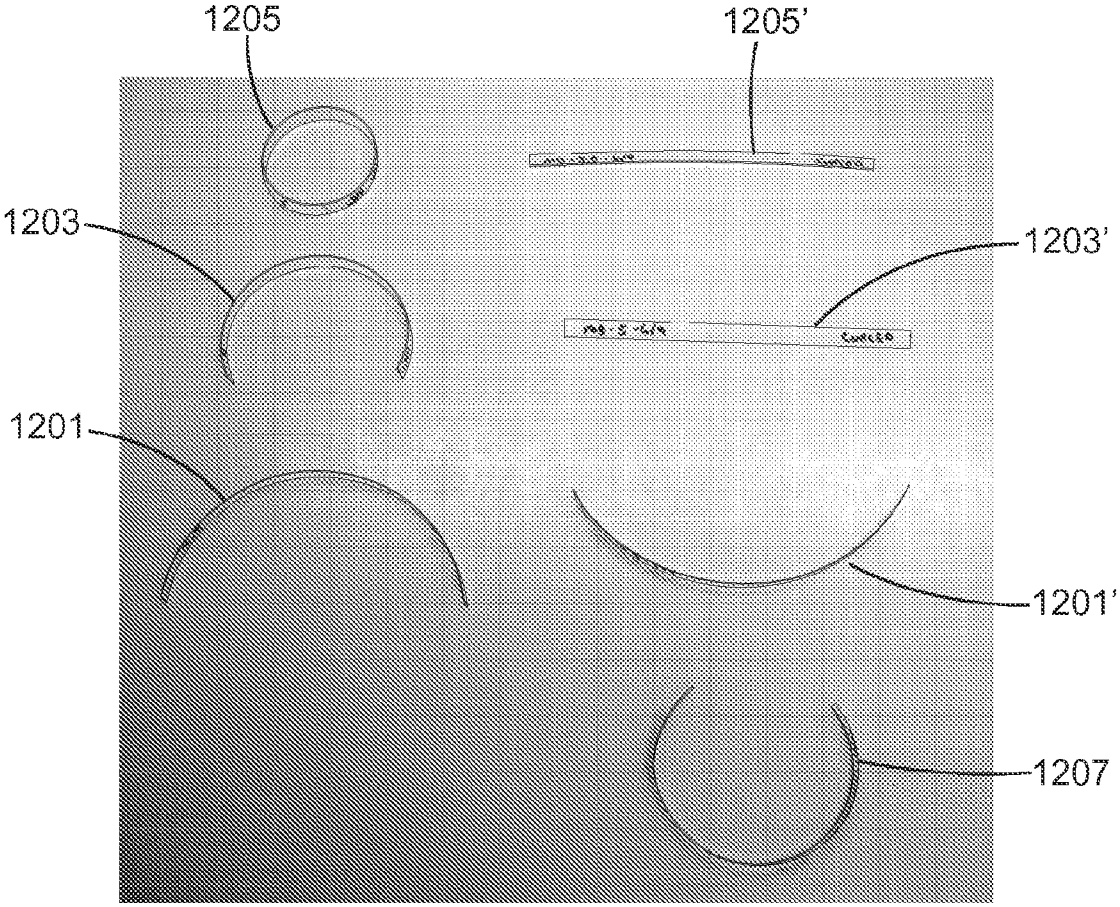
FIG. 9 is a photograph of multi-layer webs formed according to Examples 5 and 6.

Standard die coating techniques were used to coat a web comprising 75-μm-thick polyethylene terephthalate (PET) base film, having an elastic modulus in the machine direction of about 5000 MPa. The coating composition used was the same as that of Example 3. The coated film was passed through a heated air impingement drying process to remove the organic solvent, leaving a layer of uncured acrylate hardcoat. The coating was cured by ultraviolet radiation to a level that produced an elastic modulus of 1200 MPa and an effective shrinkage of 0.9%. The coating was applied to three PET films as described above to form a layer of coating that would cure to three different thicknesses of the hardcoat, namely, 2.5 μm, 5 μm, and 7.5 μm. Strips 1201, 1203 and 1205, respectively, were cut from the resulting multi-layer webs, with the long axis aligned with the machine direction of the respective multi-layer web. Each of the strips 1201, 1203, 1205 immediately curled to the extent shown in FIG. 9.

Example 6

An experiment was performed generally similar to Example 5, except that before the coating step, the PET film was pre-curled using a web bending apparatus similar to the web bending section 1122 shown in FIGS. 8 and 8A. The web bending section was set to impart to the PET film a reverse curl that would at least partially counteract the curl induced by curing the coating. A strip 1207 was cut from the resulting pre-curled film (with the long axis aligned with the machine direction of the web) prior to any coating processes to illustrate an uncoated pre-curled web. The coating and curing steps were then performed as described in Example 5. Particularly, the coating was applied to three pre-curled PET films (such as that described above and represented by strip 1207) to form a layer of coating that would cure to three different thicknesses of the hardcoat, namely, 2.5 μm, 5 μm, and 7.5 μm. As in Example 5, strips 1201', 1203' and 1205', respectively, were cut from the resulting multi-layer webs, with the long axis aligned with the machine direction. The strips 1201', 1203', 1205' immediately adopted the configurations shown in FIG. 9. It will be seen that the described level of pre-curl resulted in a multi-layer web having a reduced curl (as represented by strip 1201' having a 2.5-μm thick coating), a substantially flat multi-layer web (as represented by strip 1203' having a 5-μm thick coating), and a reverse-curled multi-layer web (as represented by strip 1205' having a 7.5-μm thick coating), depending on the thickness of the coating.

The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure. Various features and aspects of the invention are set forth in the following claims.

What is claimed is:

1. A method for reducing strain-induced curl in a multi-layer web, the method comprising:
- providing a web of indeterminate length;
- applying a coating to the web, the coating being characterized by at least partially shrinking when cured;
- curing the coating to form a multi-layer web, the multi-layer web including a curl induced by curing the coating; and
- bending the web prior to curing the coating to induce a pre-curl in the web, the pre-curl configured to substantially match and oppose the curl induced by curing said bending being accomplished by i) passing the web partly around a first bar or rod oriented at an angle of about 45° to the direction of the web approaching the bar or rod, ii) so that, downstream of the bar or rod, the web moves perpendicularly to its direction approaching the first bar or rod, iii) transporting the web to a second bar or rod oriented at an angle of about 45° to the direction of the web approaching said second bar or rod, and iv) passing the web partly around the second bar or rod so that, downstream of the second bar or rod, the web is moving in a direction perpendicular to its direction approaching the second bar or rod.

2. The method of claim 1, wherein bending the web occurs prior to applying a coating to the web.

3. The method of claim 1, wherein bending the web occurs after applying a coating to the web.

4. The method of claim 1, wherein curing includes curing by at least one of actinic radiation, UV radiation, visible-light radiation, electron beam radiation, X-ray radiation, IR radiation, heat, and combinations thereof.

5. The method of claim 1, wherein the thickness of the multi-layer web is less than about 500 μm.

6. The method of claim 1, wherein the coating comprises at least one of acrylate and epoxy.

7. The method of claim 1, wherein the multi-layer web comprises a multi-layer optical film.

8. The method of claim 1, wherein the web includes an upper surface and a lower surface, wherein the coating is applied to the upper surface or the lower surface, and wherein the web is bent such that the resulting multi-layer web has a substantially planar upper and lower surfaces.

9. The method of claim 1, wherein bending the web includes bending the web in the machine direction and the cross-machine direction.

10. The method of claim 1, wherein bending the web includes bending the web equally in the machine direction and the cross-machine direction.

11. A method for reducing strain-induced curl in a multi-layer web, the method comprising:
- providing a web of indeterminate length;
- applying a coating to the web, the coating being characterized by at least partially shrinking when cured;
- curing the coating to form a multi-layer web, the multi-layer web including a curl induced by curing the coating; and
- bending the web prior to curing the coating to induce a pre-curl in the web, the pre-curl configured to substantially match and oppose the curl induced by curing, wherein bending the web includes:
  - moving the web in a first direction along a first web transport assembly,
  - moving the web in a second direction along a second web transport assembly, and
  - moving the web through a gap defined between the first web transport assembly and the second web transport assembly to induce a strain in the web.

12. The method of claim 11, wherein the second direction is oriented substantially perpendicularly with respect to the first direction.

13. The method of claim 11, further comprising:
- moving the web in a third direction along a third web transport assembly, and
- moving the web through a gap defined between the second web transport assembly and the third web transport assembly to induce a strain in the web.

14. The method of claim 13, wherein the third direction is oriented substantially perpendicularly with respect to the second direction.

15. The method of claim 1, wherein bending the web includes moving the web over a radius sufficiently small to strain the outer surface of the web beyond its plastic deformation point.

16. The method of claim 1, wherein bending the web includes bending the web to achieve at least about 2% strain in the web.

17. The method of claim 1, wherein the pre-curl induced by bending the web causes the web to curl in a direction opposite the coating.

18. The method of claim 1, wherein the pre-curl induced by bending the web defines a concave surface of the web and a convex surface of the web, and wherein applying a coating to the web includes applying a coating to the convex surface of the web.

* * * * *